(12) United States Patent
Hatcher et al.

(10) Patent No.: US 11,815,328 B2
(45) Date of Patent: *Nov. 14, 2023

(54) MOUNTING SYSTEMS AND METHODS FOR POSITIONING A DETECTOR ON A WEAPON HOLSTER

(71) Applicant: Axon Enterprise, Inc., Scottsdale, AZ (US)

(72) Inventors: Jonathan Hatcher, Daytona Beach, FL (US); John Wilson, Phoenix, AZ (US); Nache Shekarri, Scottsdale, AZ (US); Shlesh Tiwari, Phoenix, AZ (US); Varun Sathyanarayan, Phoenix, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,774

(22) Filed: Jul. 11, 2022

(65) Prior Publication Data

US 2022/0341705 A1    Oct. 27, 2022

Related U.S. Application Data

(63) Continuation of application No. 16/825,431, filed on Mar. 20, 2020, now Pat. No. 11,385,022, which is a
(Continued)

(51) Int. Cl.
*F41C 33/02*      (2006.01)
*G08B 5/22*       (2006.01)
(Continued)

(52) U.S. Cl.
CPC ............ *F41C 33/029* (2013.01); *F41C 33/04* (2013.01); *F41C 33/041* (2013.01); *G01D 5/145* (2013.01); *G08B 5/22* (2013.01); *G08B 21/24* (2013.01)

(58) Field of Classification Search
CPC ...... F41C 33/029; F41C 33/04; F41C 33/041; G01D 5/145; G08B 5/22; G08B 21/24
See application file for complete search history.

(56) References Cited

U.S. PATENT DOCUMENTS 5,479,149 A    12/1995  Pike
9,336,663 B1    5/2016  Cohen et al.
(Continued)

OTHER PUBLICATIONS

USPTO, Non-Final Office Action for U.S. Appl. No. 16/994,066 dated Aug. 19, 2021.
(Continued)

*Primary Examiner* — Daryl C Pope
(74) *Attorney, Agent, or Firm* — Andrew Graham

(57) ABSTRACT

A detector for detecting the removal and/or insertion of a firearm out of and/or into a holster. The detector may transmit a message each time the firearm is removed from the holster. A recording system may receive the message and determine whether or not it will begin recording the data it captures. A detector may detect the change in a magnitude of an inductance and/or an impedance of a circuit to detect insertion and removal of the firearm into and out of the holster. A placement mode may be invoked to determine an optimal mounting location of the detector relative to the holster. The optimal mounting location may be a location of maximum sensitivity of the detector with respect to the weapon and/or a location wherein the measurements obtained via the detector exceed a threshold. The detector may provide indicia corresponding with the optimal mounting location.

20 Claims, 9 Drawing Sheets

Related U.S. Application Data continuation-in-part of application No. 16/218,086, filed on Dec. 12, 2018, now Pat. No. 10,775,131, which is a continuation of application No. 15/842,149, filed on Dec. 14, 2017, now Pat. No. 10,190,846.

(60) Provisional application No. 62/821,336, filed on Mar. 20, 2019, provisional application No. 62/458,941, filed on Feb. 14, 2017.

(51) Int. Cl.
    *F41C 33/04*     (2006.01)
    *G08B 21/24*     (2006.01)
    *G01D 5/14*     (2006.01)

(56) References Cited

U.S. PATENT DOCUMENTS

| | | | |
|---|---|---|---|
| 9,564,043 | B2 | 2/2017 | Sanders et al. |
| 9,879,944 | B1 | 1/2018 | Gish |
| 9,958,228 | B2 | 5/2018 | Stewart |
| 11,385,022 | B2 * | 7/2022 | Hatcher ................ G08B 21/24 |
| 2002/0161291 | A1 | 10/2002 | Kianl et al. |
| 2008/0061991 | A1 | 3/2008 | Urban et al. |
| 2013/0060115 | A1 | 3/2013 | Gehman et al. |
| 2014/0162584 | A1 | 6/2014 | Cope |
| 2015/0254968 | A1 | 9/2015 | Sanders et al. |
| 2015/0369559 | A1 | 12/2015 | Del Rosario |
| 2016/0086472 | A1 | 3/2016 | Herrera et al. |
| 2016/0165192 | A1 | 6/2016 | Saatchi et al. |
| 2016/0173832 | A1 | 6/2016 | Stewart et al. |
| 2016/0241807 | A1 | 8/2016 | Kovac |
| 2016/0286156 | A1 | 9/2016 | Kovac |
| 2016/0377373 | A1 | 12/2016 | Feldstein |
| 2017/0003101 | A1 | 1/2017 | Madrid et al. |
| 2017/0034405 | A1 | 2/2017 | Ryniec et al. |
| 2017/0054951 | A1 | 2/2017 | Weekly |
| 2017/0059265 | A1 | 3/2017 | Winter et al. |
| 2017/0059274 | A1 | 3/2017 | Crist et al. |
| 2017/0061781 | A1 | 3/2017 | Ware et al. |
| 2017/0160041 | A1 | 6/2017 | Stewart et al. |
| 2018/0100713 | A1 | 4/2018 | Patches et al. |
| 2018/0135939 | A1 | 5/2018 | Tedder et al. |

OTHER PUBLICATIONS

USPTO, Notice of Allowance and Fees Due for U.S. Appl. No. 15/842,149 dated Sep. 19, 2018.
USPTO, Notice of Allowance and Fees Due for U.S. Appl. No. 16/218,086 dated May 5, 2020.
Australian Patent Office, Australian Examination report for Australian Patent Application No. 2017399714 dated Apr. 7, 2020.
European Patent Office, Communication Pursuant to Article 94(3) EPC for European Patent Application No. 17896972.1-1011 dated Jan. 15, 2021.
European Patent Office, European Search Report for European Application No. 17896972,.1-1011 dated Dec. 18, 2020, p. 1-4.
European Patent Office, Communication pursuant to Article 94(3) EPC for European Application No. 17 896 972.1-1005 dated Mar. 3, 2022.
United States Patent and Trademark Office, Notice of Allowance for U.S. Appl. No. 16/994,066 dated Jan. 13, 2022.
International Searching Authority, International Search Report for International Patent Application No. PCT/US2017/066394 dated Mar. 19, 2018.
Screen captures from YouTube video clip entitled "BodyWorn Smart Holster Sensor Activation," 11 pages, uploaded on Mar. 29, 2019 by user "Utility, Inc.". Retrieved from Internet: <https:/lwww.youtube.com/watch?v=dqbZHhMdqffi> On Jul. 20, 2021.
Eyewitness Vantage Officer Worn Video, Web page <http://www.kustomsignals.com:80/products/product/eyewitness_vantage>, 7 pages, Oct. 1, 2017, retrieved from Internet Archive Wayback Machine <https://web.archive.org/web/20171001155148/http://www.kustomsignals.com:80/products/product/eyewitness_vantage> on Jul. 20, 2021.
Eyewitness Vantage Officer Worn Video, Web page <https://kustomsignals.com/documents_and_resources/Vantage_4-page_8.5x11_9-25-17.pdf>, 4 pages, Mar. 8, 2019, retrieved from Internet Archive Wayback Machine <https://web.archive.org/web/20171001155148/http://www.kustomsignals.com:80/products/product/eyewitness_vantage> on Jul. 20, 2021.

\* cited by examiner

MOUNTING SYSTEMS AND METHODS FOR POSITIONING A DETECTOR ON A WEAPON HOLSTER

CROSS-REFERENCE TO RELATED APPLICATIONS

This application is a continuation of U.S. patent application Ser. No. 16/825,431, filed on Mar. 20, 2020, which is a continuation-in-part of U.S. patent application Ser. No. 16/218,086, filed on Dec. 12, 2018, which is a continuation of U.S. patent application Ser. No. 15/842,149, filed on Dec. 14, 2017, which claims the benefit of U.S. Provisional Patent Application No. 62/458,941, filed on Feb. 14, 2017, each of which is incorporated by reference herein in its entirety. This application also claims the benefit of U.S. Provisional Patent Application No. 62/821,336, filed on Mar. 20, 2019, which is incorporated by reference herein in its entirety.

FIELD OF THE INVENTION

Embodiments of the present invention relate to a detector that detects presence and absence of a weapon in a holster.

BACKGROUND

Public safety personnel, such as police officers and firefighters use cameras to capture events, so that a video and/or audio record exists of what happened in an incident. Several methods exist to trigger cameras to begin capturing. Speed activation and crash detection are such triggers for vehicle-mounted cameras. For officers equipped with either a conducted electrical weapon ("CEW") or a traditional firearm, it is also imperative that a camera capture events leading up to and after a situation in which a weapon is drawn by an officer. Sensors designed to mount to holsters may detect whether a firearm is in the holster.

A standard mechanism of attaching a sensor to a holster is through use of mechanical brackets, which are attached with screws between the holster body and the holster's mount. However, each bracket must be designed specifically for select holster models and firearms, limiting the number of holsters with which a detector could be compatible.

Proper placement of the sensor is critical for effective performance of the sensor. Improper placement of the sensor could lead to erroneous triggering of a camera when the weapon is not removed, or a camera not being activated when a weapon is removed from the holster. What is needed, therefore, are systems and methods that address one or more of these deficiencies.

BRIEF SUMMARY

The following presents a general summary of aspects of this disclosure in order to provide a basic understanding of the disclosure. This summary is not an extensive overview of the disclosure. The following summary merely presents some concepts of the disclosure in a general form as a prelude to the more detailed description provided below.

Aspects of this disclosure may relate to method performed by a detector for identifying an optimal mounting location for the detector on a provided holster, wherein the detector is for detecting at least one of a presence and an absence of a provided weapon in the provided holster. The method may comprise the following: responsive to receiving a first electronic signal from a control, initiating a placement mode; obtaining measurements via a sensor located within the detector as the detector is moved about a surface of the provided holster; in accordance with the measurements obtained via the sensor, determining an optimal location of the detector with respect to the provided holster; and providing indicia via an indicator indicating the detector is at the optimal location with respect to the provided holster.

Implementations of the method may include where obtaining measurements via the sensor comprises detecting values of one of inductance, impedance, and frequency. The method may include where the optimal location of the detector with respect to the provided holster comprises determining one of a position of maximum sensitivity to the provided firearm inserted in the provided holster and the position where a value of the values of one of inductance, impedance, and frequency exceeds a threshold. In other implementations, the method may include where responsive to receiving a second electronic signal from the control, determining whether the detector is at the optimal location with respect to the holster, and in response to determining the detector is at the optimal location with respect to the holster, exiting the placement mode. The method may include where responsive to receiving a second electronic signal from the control, determining whether the detector is at the optimal location with respect to the holster, and in response to determining the detector is at a nonoptimal location with respect to the holster, remaining in the placement mode. The method may further include responsive to initiating the placement mode, providing another indicium via the indicator indicating initiation of the placement mode. The method may include where the indicator comprises a light-emitting diode ("LED"), and providing indicia via the indicator comprises blinking a green light.

In various embodiments, the method may include where providing indicia via the indicator comprises providing continuous indicia as the detector is moved about the surface of the provided holster, where the continuous indicia indicate whether a location of the detector relative to the provided holster is more preferred or less preferred than a prior location of the detector relative to the provided holster. Implementations of the method may include where providing continuous indicia via the indicator comprises providing one of tactile, visual, and audible indicia. The method may include where providing continuous indicia via the indicator comprises changing one of a color, a brightness, and a frequency of the indicia between the optimal location and a nonoptimal location.

Another aspect of this disclosure may relate to a system for detecting at least one of a presence and an absence of a provided weapon in a provided holster, the apparatus comprising: a mount having a base formed of a rigid material; a tape, where a first side of the tape adheres to the base of the mount to couple the tape to the mount, and where a second side of the tape is configured to adhere to the provided holster to couple the mount to the provided holster; and a detector coupled to the mount, the detector comprising a sensor circuit, a memory, and a processor communicatively coupled to the sensor circuit and the memory, where the sensor circuit is configured to detect at least one of the presence and the absence of the provided weapon in the provided holster, and where the processor is configured to execute operations stored in the memory to perform operations. The operations may comprise: responsive to receiving a first signal from a user interface, initiating a placement mode; obtaining multiple readings with the sensor circuit as the detector traverses a surface of the provided holster; in accordance with the multiple readings obtained with the sensor circuit, determining an optimal location of the detector relative to the provided holster; and providing indicia via the user interface that indicate the detector is at the optimal location with respect to the provided holster.

Implementations of the system may include where obtaining multiple readings with the sensor comprises detecting values of one of inductance, impedance, and frequency. The system may include where determining the optimal location of the detector relative to the provided holster comprises determining one of a location of maximum sensitivity to the provided firearm inserted in the provided holster and the location wherein a reading of the multiple readings exceeds a threshold. The system may comprise responsive to receiving a second signal from the user interface, determining whether the detector is at the optimal location with respect to the holster, and in response to determining the detector is at the optimal location with respect to the holster, exiting the placement mode. The system may further comprise responsive to receiving a second signal from the user interface, determining whether the detector is at the optimal location with respect to the holster, and in response to determining the detector is at a nonoptimal location with respect to the holster, remaining in the placement mode. The system may comprise responsive to initiating the placement mode, providing other indicia via the indicator indicating initiation of the placement mode. Implementations of the system may further comprise a placement tag, where the placement tag is configured to temporarily position the detector and mount relative to the provided holster during installation.

In various embodiments, the system may include where providing indicia via the indicator comprises providing continuous indicia as the detector traverses the surface of the provided holster, where the continuous indicia indicate whether a location of the detector relative to the provided holster is more preferred or less preferred than a prior location of the detector relative to the provided holster. Implementations of the system include where providing continuous indicia via the indicator comprises providing one of tactile, visual, and audible indicia. Other implementations of the system include where providing continuous indicia via the indicator comprises changing one of a color, a brightness, and a frequency of the indicia between the optimal location and a nonoptimal location.

BRIEF DESCRIPTION OF THE SEVERAL VIEWS OF THE DRAWING

Embodiments of the present invention will be described with reference to the drawing, wherein like designations denote like elements, and.

DETAILED DESCRIPTION OF THE DETECTOR

Body cameras, vehicle cameras, wireless microphones and/or other recording systems are used by many security forces to record the events of an incident. Security forces include police departments, investigative and enforcement departments of a government (e.g., DOJ, FBI, CIA, ATF, CPB), and military forces. A recording, if properly handled, may serve as evidence in a subsequent proceeding. The operation of a recording system may be initiated manually or by a trigger. A trigger may include a signal sent to the recording system. A signal may be sent by a wired or wireless circuit. A signal sent wirelessly may include sending a message (e.g., information, data packet) using any conventional wireless communication protocol.

A trigger may be obligatory or permissive. A recording system (e.g., recording device, camera, microphone, video recorder) must initiate recording upon receipt of an obligatory trigger. A recording system that receives a permissive trigger is not required to initiate recording. A permissive trigger may include a message transmitted and/or received wirelessly that reports the status and/or the identity of the device sending the message. A recording system may initiate recording depending on the value of the status. A recording system may initiate recording depending on the value identity of the sending device. A recording system may decline to initiate recording from some values.

A situation for which it is desirable to initiate recording by recording systems is when a security officer draws a weapon (e.g., firearm). In many instances, personnel of security forces carry conventional firearms. In many instances, such firearms are carried bodily in a holster for transport and immediate access in case of need. Withdrawing a weapon from a holster may indicate that events of an incident are about to occur or that have just occurred should be recorded. A system for providing a notice, as discussed herein, may detect withdrawal of a weapon from a holster and provide a notice (e.g., trigger, message, permissive trigger, obligatory trigger) that the weapon has been withdrawn. A notice system may provide a notice in the form of a message transmitted wirelessly. Recording systems may receive the wireless notice. A recording system, depending on the type of notice (e.g., obligatory, permissive) may start recording.

A system for providing a notice may also provide a notice that the weapon has been inserted into the holster.

A system for providing a notice may provide a permissive trigger. A system for providing a notice may provide information that a recording system may use to determine whether or not to start recording. A recording system may use information provided by a system for providing a notice to perform other functions.

Information may include a unique identifier (e.g., alphanumerical, serial number) of a detector, a state of operation of the detector, and/or an identity of the user of the system that provides the notice.

Figure 1:
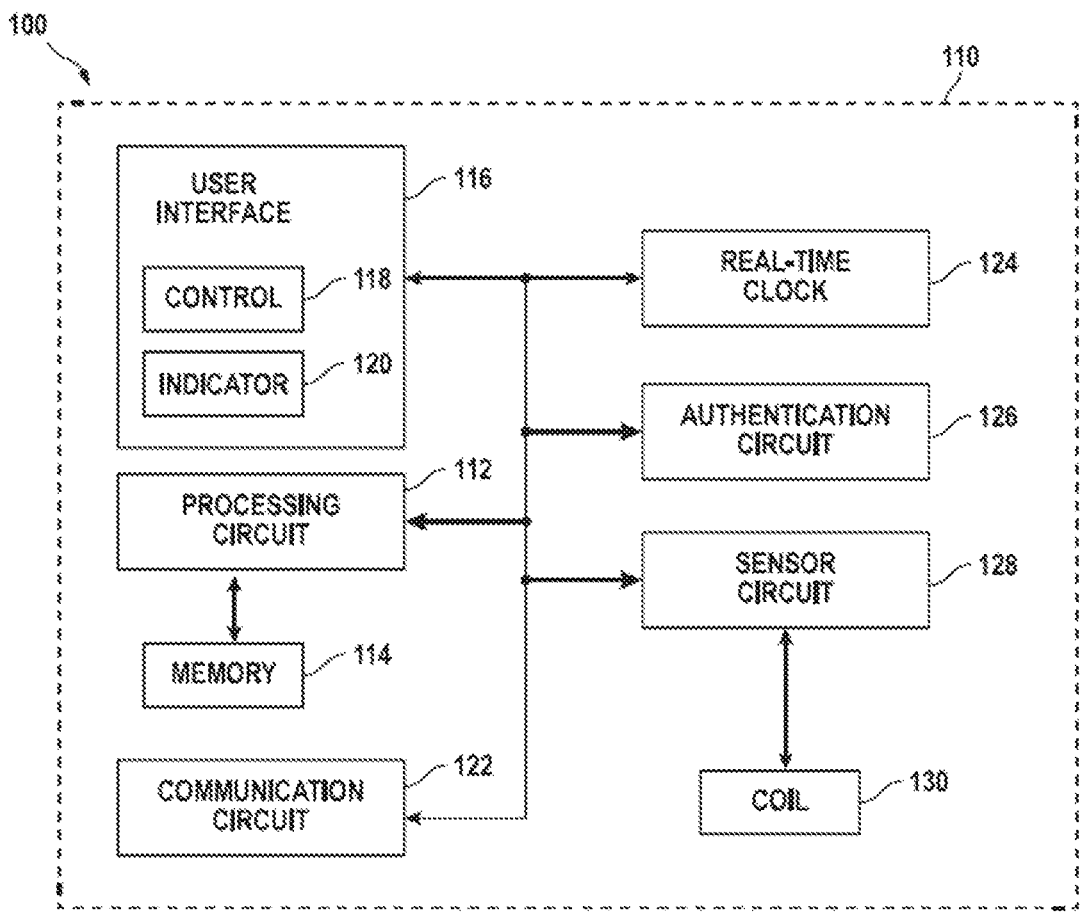
FIG. 1 is a block diagram of a system for providing a notice according to various aspects of the present disclosure.
Figure 1:
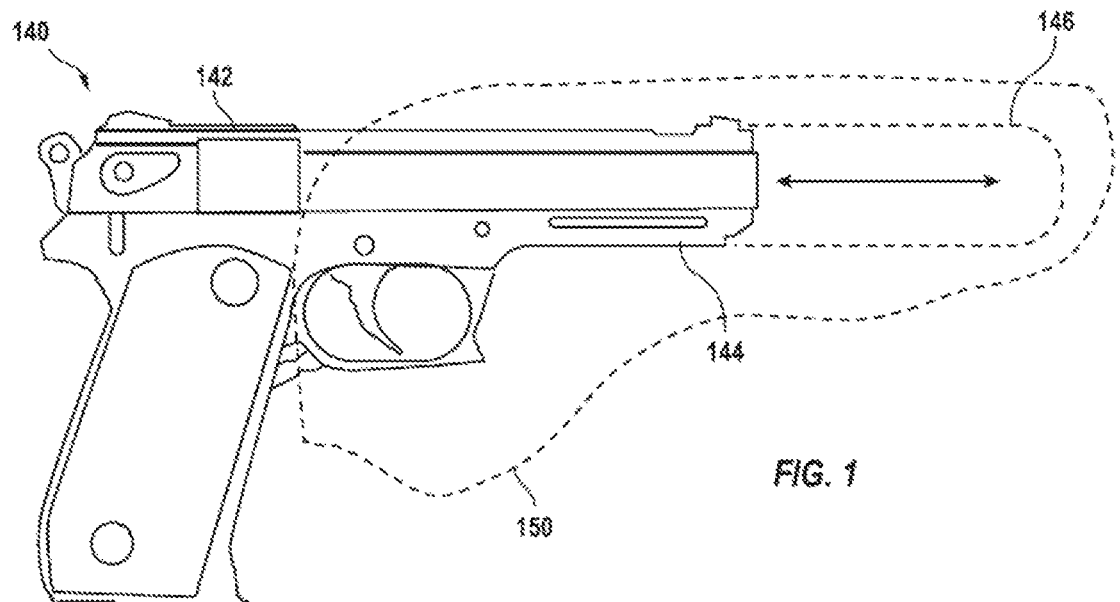

For example, system for providing a notice system 100 of FIG. 1 includes detector 110 and firearm system 140. Firearm system 140 includes firearm 142 and holster 150. Firearm 142 may include a conventional handheld firearm. Firearm 142 includes barrel 144. At least a portion of barrel 144 is formed of metal that is susceptible to detection using inductive sensing.

Detector 110 includes processing circuit 112, memory 114, user interface 116, communication circuit 122, real-time clock 124, authentication circuit 126, sensor circuit 128, and coil 130. User interface 116 includes control 118 and indicator 120. Detector 110 may further include NFC tag 860.

A detector detects whether a firearm is positioned in a holster. A detector detects whether a firearm is positioned out of (e.g., removed from) the holster. Depending on the implementation of the sensor circuit, the coil, and their sensitivity, a detector may detect the position of a firearm in a holster as opposed to solely whether the firearm is in or out of the holster.

A detector may wirelessly transmit a notice (e.g., message, data packet, data, signal, trigger) in response to detecting a change in the status of a firearm with respect to a holster. A change in status includes withdrawing of the firearm from the holster and inserting the firearm into the holster. The notice may include information to describe the detector transmitting the data, the user of the detector, the user of the firearm, the date and time of detecting, date and time of transmission of the notice, the status of the holster (e.g., firearm withdrawn, firearm inserted, firearm partially withdrawn, firearm partially inserted), previously transmitted dates and/or times, and/or previously transmitted status. The notice may further include information for authenticating the detector to one or more recording systems.

One or more recording systems may receive a notice from notice system 100. A recording system may use the information transmitted with the notice to determine whether or not (e.g., permissive trigger) to perform an operation (e.g., perform a function). An operation of a recording system may include starting (e.g., initiating) recording.

A detector may store information in a memory (e.g., a log). Information stored by a detector may include information related to the operation and/or status of the detector. Information stored by a detector may be stored as an entry in the log. Each entry in a log may include the date and time of recording the entry. Information stored in a log may include detecting withdraw of a weapon from a holster, detecting insertion of a weapon into a holster, activation (e.g., starting, operation of) a mute operation of the recorder, resetting of the detector, setting of the time of the circuit used to generate timestamps or to record actions in the log, executing a software (e.g., firmware) upgrade, updates to user settings, reverting to an earlier version of software, and/or detecting a system fault. The mute operation, discussed in more detail below, alters the information transmitted in one or more notices for a period of time.

A detector may receive information (e.g., data) such as information to upgrade the software of the detector. A detector may receive information from a user via a user interface. A detector may provide information to a user via the user interface.

A processing circuit includes any circuitry, component, and/or electrical/electronic subsystem for performing a function. A processing circuit may include circuitry that performs (e.g., executes) a stored program. A processing circuit may include a digital signal processor, a microcontroller, a microprocessor, an application specific integrated circuit, a programmable logic device, logic circuitry, state machines, MEMS devices, signal conditioning circuitry, communication circuitry, a conventional computer, a conventional radio, a network appliance, data busses, address busses, and/or a combination thereof in any quantity suitable for performing a function and/or executing one or more stored programs.

A processing circuit may further include conventional passive electronic components (e.g., resistors, capacitors, inductors) and/or active electronic components (op amps, comparators, analog-to-digital converters, digital-to-analog converters, programmable logic). A processing circuit may include conventional data buses, output ports, input ports, timers, memory, and arithmetic units.

A processing circuit may provide and/or receive electrical signals whether digital and/or analog in form. A processing circuit may provide and/or receive digital information via a conventional bus using any conventional protocol. A processing circuit may receive information, manipulate the received information, and provide the manipulated information. A processing circuit may store information and retrieve stored information. Information received, stored, and/or manipulated by the processing circuit may be used to perform a function and/or to perform a stored program.

A processing circuit may have a low power state in which only a portion of its circuits operate or it performs only certain functions. A processing circuit may be switched (e.g., awoken) from a low power state to a higher power state in which more or all of its circuits operate or it performs additional certain functions or all of its functions.

A processing circuit may control the operation and/or function of other circuits and/or components of a system. A processing circuit may receive status information regarding the operation of other components, perform calculations with respect to the status information, and provide commands (e.g., instructions) to one or more other components for the component to start operation, continue operation, alter operation, suspend operation, or cease operation. Commands and/or status may be communicated between a processing circuit and other circuits and/or components via any type of bus including any type of conventional data/address bus. A processing circuit may instruct a circuit or component to enter a low power state. A processing circuit may instruct a circuit or component to exit a low power state.

A memory stores information. A memory provides previously stored information. A memory may provide previously stored information responsive to a request for information. A memory may store information in any conventional format. A memory may store electronic digital information. A memory may provide stored data as digital information.

A memory includes any semiconductor, magnetic, or optical technology (e.g., device, chip, system), or a combination thereof for storing information. A memory may receive information from a processing circuit for storage. A processing circuit may provide a memory a request for previously stored information. Responsive to the request the memory may provide stored information to the processing circuit.

A memory may include any circuitry for storing program instructions and/or data. Storage may be organized in any conventional manner (e.g., program code, buffer, circular buffer, database). Memory may be incorporated in and/or accessible by a transmitter, a receiver, a transceiver, a sensor, a controller, and/or a processing circuit.

A communication circuit transmits and/or receives information (e.g., data). A communication circuit may transmit and/or receive (e.g., communicate) information via a wired and/or wireless communication link. A communication circuit may communicate using wireless (e.g., radio, light, sound, vibrations) and/or wired (e.g., electrical, optical) mediums. A communication circuit may communicate using any wireless (e.g., Bluetooth, Zigbee, WAP, WiFi, NFC, IrDA, LTE, BLE, EDGE, EV-DO) and/or wired (e.g., USB, RS-232, Firewire, Ethernet) communication protocols.

A communication circuit may receive information from a processing circuit for transmission. A communication circuit may provide received information to a processing circuit.

A communication circuit in one device (e.g., detector) may communicate with a communication circuit in another device (e.g., smart phone, tablet, mobile computer, server). Communications between two devices may permit the two devices to cooperate in performing a function of either device. For example, a user interface for a detector may be implemented on a smart phone that includes a touch screen. User interaction with the user interface on the smart phone is communicated to the detector via the communication circuits of the smart phone and detector. The detector performs the function indicated by the message from the smart phone. Any information produced by the detector for the user may be communicated from the detector to the smart phone via the communication circuits for presentation on the display of the smart phone.

A user interface enables a human user to interact with an electronic device (e.g., detector). A user may control, at least in part, an electronic device via the user interface. A user may provide information and/or commands to an electronic device via a user interface. A user may receive information (e.g., status) and/or responses from the electronic device via the user interface.

A user interface may include one or more controls that permit a user to interact and/or communicate with (e.g., provide information to) an electronic device to control (e.g., influence) the operation (e.g., functions) of the electronic device.

As discussed above, a user interface may provide information to a user. A user may receive visual, haptic (e.g., tactile, kinesthetic), and/or audible information from a user interface. A user may receive visual information via devices (e.g., indicators) that visually display information (e.g., LCDs, LEDs, light sources, graphical and/or textual display, display, monitor, touchscreen). A user may receive audible information via devices that provide an audible sound (e.g., speaker, buzzer). A user may receive tactile information via devices that vibrate, move, and/or change resistance against a user's finger as it is pressed.

A user interface may include a communication circuit for transmitting information to an electronic device for presentation to a user, as discussed above.

A control includes any electromechanical device suitable for manual manipulation by a user. A control includes any electromechanical device for operation by a user to establish or break an electrical circuit. A control may include a portion of a touch screen. Operation of a control may occur by the selection of a portion of a touch screen. A control may include a switch. A switch includes a pushbutton switch, a rocker switch, a key switch, a detect switch, a rotary switch, a slide switch, a snap action switch, a tactile switch, a thumbwheel switch, a push wheel switch, a toggle switch, a reed switch, and a key lock switch (e.g., switch lock).

A control may be operated in different manners by a user to provide different information to a detector. For example, in an implementation in which the control is implemented as a push button, a user may press and release the button; press, hold the button for a period of time, then release the button during which the period of time for which the button is held determines whether the press is a long press or a very long press; press the button, release, press again, release (e.g., double press).

The term "control", in the singular, represents a single electromechanical device for operation by a user to provide information to a device. The term "controls", in plural, represents a plurality of electromechanical devices for operation by a user to provide information to a device. The term "controls" include at least a first control and a second control.

A processing circuit may detect the operation of a control. A processing circuit may perform a function responsive to operation of a control. Responsive to a control, a processor may perform a function, halt a function, resume a function, or suspend a function of the electronic device of which the control and the processor are a part. A control may provide analog or binary information to a processor.

The function performed by an electronic device responsive to operation of a control may depend on the current operating state (e.g., present state of operation, present function being performed) of the electronic device of which the control is a part.

A user may receive information from an electronic device via an indicator. An indicator may provide information visually, via haptic feedback, and/or audibly as discussed above. In an implementation in which the indicator is implemented as an LED, the indicator may convey information by turning the LED on and off (e.g., blink) or vice versa, the color of light provided by the LED, the rate of turning the LED on and off, the duration of time the LED is on or off, and/or the sequence of colors provided by the LED.

A real-time clock tracks (e.g., follows, keeps track of) the current (e.g., present) time. The functions of a real-time clock may be performed by a processing circuit. A dedicated circuit may perform the functions of a real-time clock. A real-time clock may be highly accurate (e.g., 5 seconds-12 minutes lost or gained per year). A real-time clock may further track day, date, and year. A real-time clock may provide the present time to a processing circuit. A real-time clock may track time even when other circuits are powered down. A processing circuit may perform some or all of the functions performed by a real-time clock.

Authentication is the act of verifying a claim of identity. Authentication may be used to confirm a user's identity. For example, a bank may authenticate the identity of a person requesting a withdrawal by asking for and inspecting photo ID. Computers may confirm the identity of a user by the user providing a user name and password. One electronic device may be authenticated to another electronic device. Authentication may also be accomplished by a challenge-response protocol in which one party, or electronic device, issues a challenge and the person, or electronic device, must provide a valid answer to be authenticated.

Cryptographic techniques may be used to confirm the identity of a user. For example, Public Key Infrastructure permits authentication using public and private keys. One device has a private key and issues a public key. When the device requests communication with another device, such as a computer, the computer generates and sends a random number to the user. The user encrypts the random number using its private key. The device sends the encrypted number back to the computer. The computer uses the device's public key to decrypt the encrypted number. If the decrypted number matches the originally sent random number, then the identity of the user has been authenticated to the computer.

An authentication circuit may be used to authenticate a user and/or an electronic device. An authentication circuit may store keys, generate random numbers, generate guaranteed unique numbers, encrypt, and decrypt. An authentication circuit may perform public key (e.g., PKI) algorithms such as high-speed PKI algorithms and elliptical curve algorithms (e.g., P256, B283, K283). An authentication circuit may perform digital signature algorithms such as Digital Signature Algorithm (e.g., FIPS 186, 186-1, 186-2, 186-3, 186-4) and elliptical curve digital signature algorithms (e.g., FIPA 186-3).

An authentication circuit may cooperate with a processing circuit, a user interface, and/or a communication circuit to authenticate a user and/or a device.

A sensor circuit detects (e.g., measures, witnesses, discovers, determines) a physical property (e.g., intensive, extensive, isotropic, anisotropic). A physical property may include momentum, capacitance, electric charge, electric impedance, electric reactance, inductance, electric potential (e.g., electromotive force), frequency, luminance, luminescence, magnetic field, magnetic flux, mass, electromagnetic field, pressure, spin, stiffness, temperature, tension, velocity, sound, heat, and time. A sensor circuit may detect a quantity, a magnitude, and/or a change in a physical property. A sensor circuit may detect a physical property and/or a change in a physical property directly and/or indirectly. A sensor circuit may detect a physical property and/or a change in a physical property of an object.

A sensor circuit may detect a physical quantity (e.g., extensive, intensive). A physical quantity may be positive, negative, or zero. A sensor circuit may detect a change in a physical quantity directly and/or indirectly. A sensor circuit may detect one or more physical properties and/or physical quantities at the same time (e.g., in parallel), at least partially at the same time, or serially. A sensor circuit may deduce (e.g., infer, determine, calculate) information related to a physical property. A physical quantity may a magnitude of any of the physical properties discussed above. For example, a physical quantity may include an amount of time, an elapse of time, a magnitude of an electric current, an amount of electrical charge, a magnitude of a current density, a magnitude of a voltage, an amount of capacitance, an amount of inductance, a magnitude of impedance, a magnitude of reactance, a magnitude of a magnetic field, and a flux density.

A sensor circuit may provide force to detect a physical property and/or a physical quantity. A force may include an electromotive force (e.g., voltage, current). A force may be provided before, coincident with, and/or after detecting. A force may be provided once, periodically, repeatedly, and/or as needed. An electromotive force may include a direct current ("DC") or an alternating current ("AC"). For example, a sensor circuit may provide a voltage to detect a capacitance. A sensor circuit may provide a current to generate an electromagnetic field and/or to detect a change in an electromagnetic field. A sensor circuit may provide a current to an LC circuit (e.g., LC tank circuit) to cause the LC circuit to oscillate. Providing a force may include providing a current to a coil to produce an electromagnetic field.

A sensor circuit may include and/or cooperate with a processing circuit for detecting, transforming, relating, and deducing physical properties and/or physical quantities. A processing circuit that is part of or cooperates with a sensor circuit may include any conventional circuit for detecting, transforming, relating, and deducing physical properties and/or physical quantities. For example, a processing circuit may include a voltage sensor, a current sensor, a charge sensor, an electromagnetic sensor, and/or a frequency sensor.

A sensor circuit may provide information. A sensor circuit may provide information regarding a physical property and/or a change in a physical property. A sensor circuit may provide information regarding a physical quantity and/or a change in a physical quantity. A sensor circuit may provide information regarding information determine using a processing circuit.

For example, a sensor may drive an LC circuit, a frequency counter may measure the frequency of the oscillation of the LC circuit, the measured frequency may be compared to a reference frequency (e.g., clock), the current drawn by the LC circuit may be measured and from the measured frequency and current the parallel resistance of the LC circuit may be deduced. The magnitude of the parallel resistance may be used to determine whether the LC circuit operates in the presence or absence of a weapon in a holster.

In another example, a sensor may be implemented using an inductance-to-digital converter ("LDC"), such as the LDC1101 from Texas Instruments. An LDC performs the functions of a sensor circuit. The LDC couples to a coil, provides an alternating current to the coil to generate an electromagnetic field through the coil, measures the inductance and/or equivalent parallel impedance of the circuit that includes the coil, converts the measure inductance and/or impedance to a digital number and reports the number. The LDC may also detect a change in the measured inductance and/or impedance. A processing circuit may receive the digital numbers reported by an LDC. An LDC may provide a current to an LC tank circuit, measure the frequency of the oscillations of the LC tank circuit, and deduce the inductance of the LC tank circuit, and report the inductance of the LC tank circuit.

An LDC may provide current to an LC tank circuit, measure the electrical current or power consumed by the LC tank circuit, and deduce the electrical resistance or impedance of the LC tank circuit, and report the resistance or impedance of the LC tank circuit.

Because metal (e.g., barrel of a gun) alters (e.g., changes, interacts with) with the electromagnetic field generated by the LDC via the coil, the LDC, in cooperation with processing circuit 112, may detect the presence and/or absence of metal. The LDC may measure the inductance of the circuit that includes the coil in the absence of metal, measure the inductance in the presence of metal, and report the values to processing circuit 112. Information from a user via user interface 116 may include whether the firearm was in the holster or not for each measurement made by the LDC.

Further, because metal (e.g., barrel of a gun) alters the value of the inductance in an LC tank circuit and thereby the resonant frequency of the LC tank circuit, an LDC coupled to the LC tank circuit may detect the presence and/or absence of metal.

The LDC may measure the resonant frequency of an LC tank circuit that includes the coil in the absence of metal and the presence of metal and reports the values to processing circuit 112. Processing circuit 112 may receive information from the user via user interface 116 to associate the information provided by the LDC with whether the gun was in the holster or not. Processing circuit 112 may determine whether the gun is in the holster using prior values reported by the LDC and the current values reported by the sensor circuit 128.

A coil is a conductor shaped to form a closed geometric path. A closed geometric path is not a closed conducting path unless the two ends of the coil are electrically coupled together. Coils may have multiple turns. A coil may be wrapped around an iron core or an insulating form, or it may be self-supporting. A coil may be formed in a plane of a printed circuit board. A coil may be formed in one or more planes (e.g., layers) of a printed circuit board.

Providing an AC signal to a coil causes the coil to generate an electromagnetic field. Metal may interact (e.g., interfere) with the electromagnetic field generated by a coil, as discussed above. Interaction of the magnetic field of a coil with metal alters the measured inductance of the coil. A sensor circuit may provide an AC signal to a coil to cause the coil to generate an electromagnetic field. A sensor circuit may detect the interaction of metal with the electromagnetic field. A sensor circuit and coil may detect a proximity of metal by detecting the presence or absence of interaction with the electromagnetic field by metal. Detecting interaction with the electromagnetic field may be referred to as inductive sensing.

For example, coil 200 is formed of conductor 220 on one or more layers of printed circuit board ("PCB") 210. The two end portions of conductor 220, end portion 250 and end portion 350 are available to couple to a sensor circuit. A forward portion of coil 200, the portion facing outward in FIG. 2 and upward in FIG. 3, is for positioning toward a holster for detecting the presence or absence of the metal of a firearm in the holster.

Figure 2:
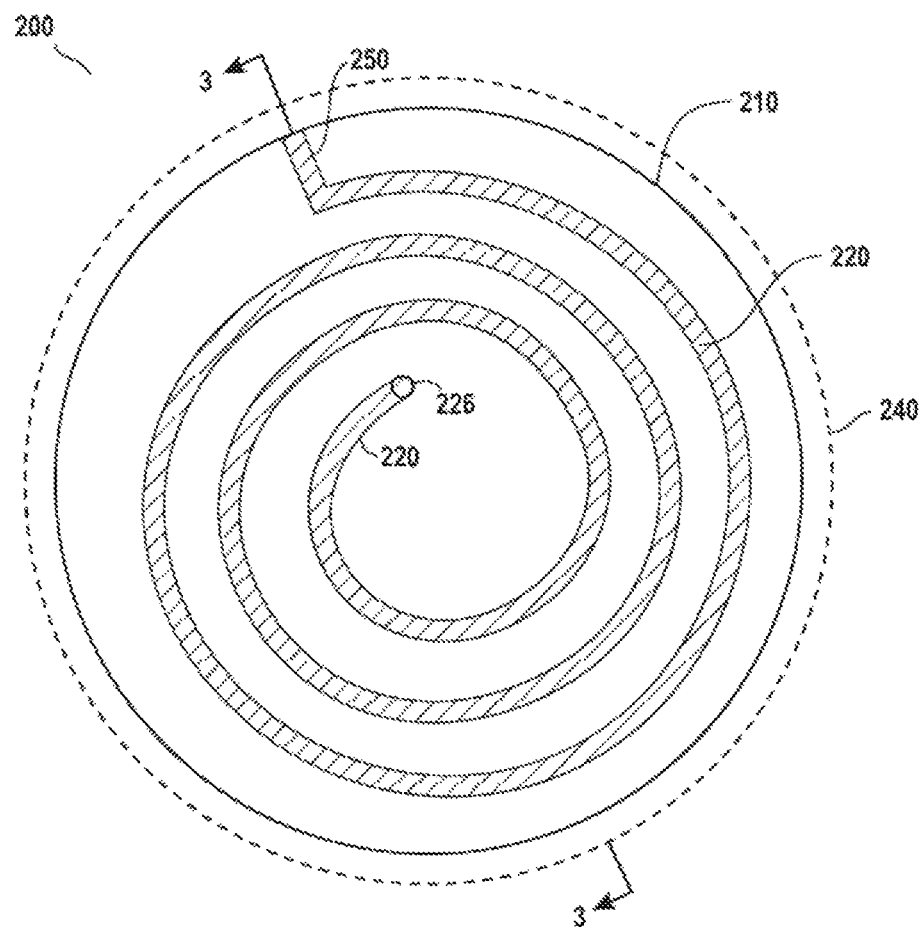
FIG. 2 is a diagram of an implementation of the coil of FIG. 1.
Figure 3:
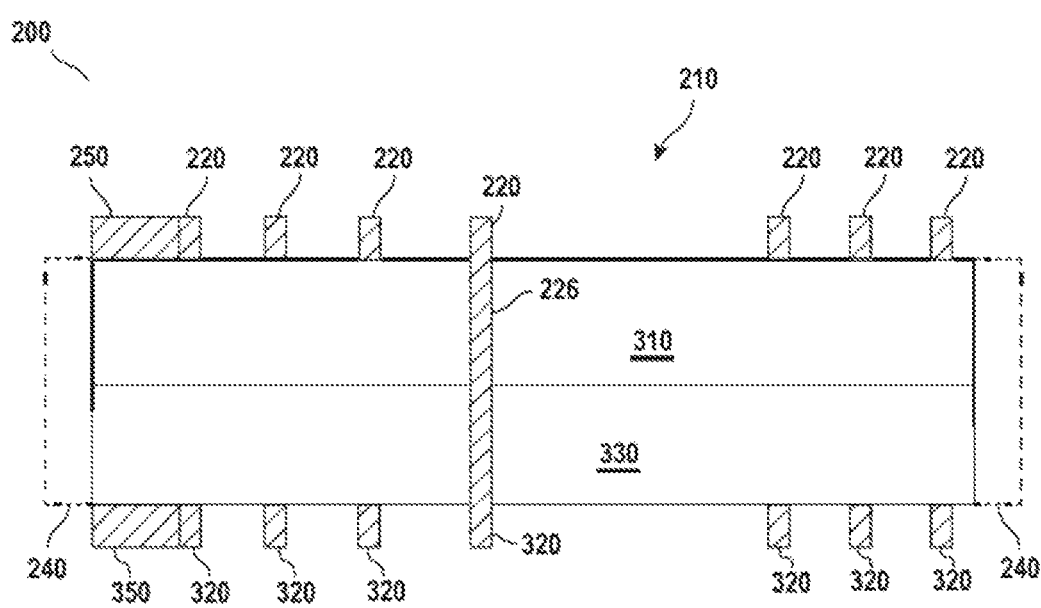
FIG. 3 is a cross-section view of the coil of FIG. 2 along 3-3.

Coil 200 may include shield 240, around conductor 220 in FIG. 2 and to the right and left sides in FIG. 3. Shield 240 shields conductor 220 from electromagnetic noise and interaction with metal placed to the side of coil 200 rather than the forward portion of coil 200. For example, shield 240 shields coil 200 from interaction with the metal of a vehicle door when a user leans against the door while wearing a holster equipped with detector 110. Shield 240 may also set (e.g., limit, focus, direct, point) the direction of the electromagnetic field generated by coil 200 and thereby the direction of sensing by coil 200. In an implementation, shield 240 limits coil 200 to detecting metal forward (e.g., outward with respect to FIG. 2, and upward with respect to FIG. 3) of conductor 220.

A shield may further extend to behind coil 200 (e.g., behind in FIG. 2, below in FIG. 3) (not shown) to provide shielding to a rear portion of coil 200.

A shield may be coupled to an electric potential (e.g., ground, any voltage). A shield may be uncoupled to an electric potential (e.g., floating).

In an implementation, coil 200 includes conductor 220 formed on a first layer of PCB 210 and conductor 320 formed on a second layer of PCB 210. Conductors 220 and 320 are formed of metal (e.g., copper, aluminum, alloy). Conductor 220 is deposited on (e.g., in) layer 310 of PCB 210. Conductor 320 is deposited on (e.g., in) layer 330 of PCB 210. Conductor 320 may include the same electrical (e.g., impedance, inductance) and physical (e.g., number of turns, shape, position with respect to PCB 210 and/or conductor 220) characteristics as conductor 220. Conductor 220 may couple serially to conductor 320.

In the implementation of FIGS. 2 and 3, conductor 220 is positioned on first layer 310 of PCB 210. End portion 250 of conductor 220 extends to an edge of PCB 210 for electrical coupling. Conductor 320 is positioned on layer 330 of PCB 210. Conductor 320 has the same number of turns and shape as conductor 220. An end portion of conductor 220 couples to an end portion of conductor 320 via conductor 226 so that conductor 220 serially couples to conductor 320. Because conductor 220 serially couples to conductor 320, a current flowing into end portion 250 of conductor 220 flows out of end portion 350 of conductor 320. Applying a voltage between end portion 250 and end portion 350 applies a voltage across conductor 220 and conductor 320.

In another implementation, coil 200 includes only conductor 220 implemented on layer 310 of PCB 210.

Shield 240 may be integral with PCB 210. Shield 240 may be separate from PCB 210. PCB 210 may be placed inside shield 240. Shield 240 may be placed around all or a portion of PCB 210. A shield may be formed of a metal such as aluminum, nickel, or copper.

Figure 4:
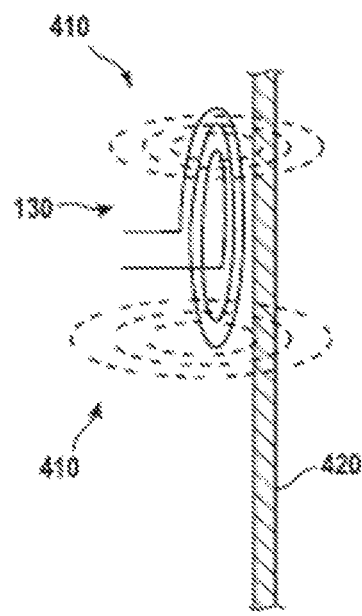
FIG. 4 is a diagram of an electromagnetic field from the coil of FIG. 1 or FIG. 2 in the absence of a weapon.

When coil 130 is excited (e.g., driven, powered) with a signal (e.g., AC, impulse) from the sensor circuit 128, coil 130 generates electromagnetic field 410 that extends from coil 130. Coil 130 may be position proximate to wall 420 of a holster so that electromagnetic field 410 extends through wall 420 into the cavity of the holster where the firearm is positioned when the firearm is in the holster. In the absence of the firearm, shown in FIG. 4, nothing interacts with electromagnetic field 410. Sensor circuit 128 may measure the inductance of coil 130 in the absence of the firearm from the holster.

Figure 5:
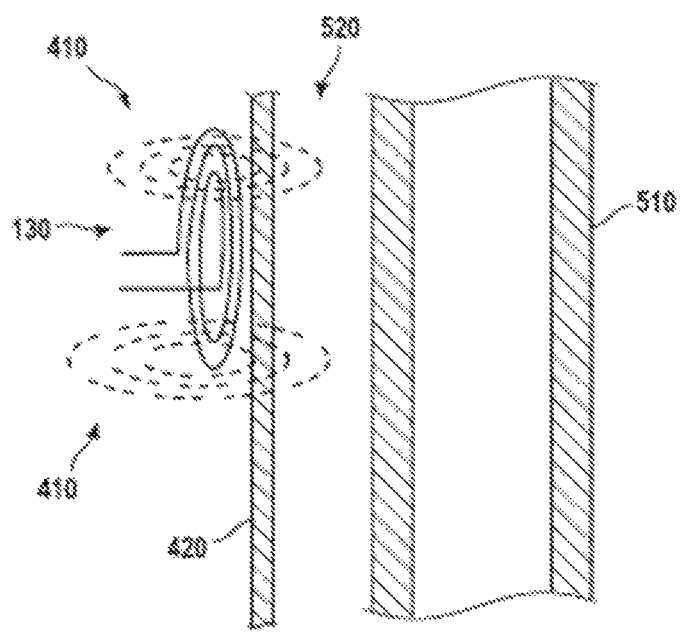
FIG. 5 is a diagram of the electromagnetic field from the coil of FIG. 1 or FIG. 2 in the presence of a weapon.
Figure 9:
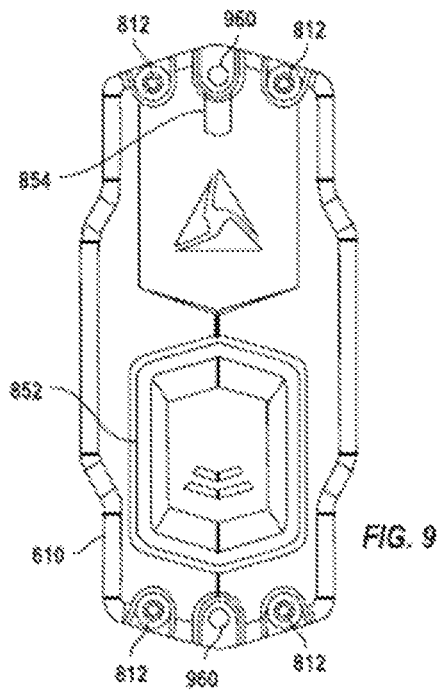
FIG. 9 is a front view of the implementation of the detector of FIGS. 6-8.

When the firearm is inserted into the holster, referring to FIG. 5, metal from the firearm, in this case, barrel 510, interacts with electromagnetic field 410 thereby changing the perceived (e.g., measured) inductance of coil 130. Sensor circuit 128 can sense the difference in the inductance when the firearm is present in the holster. In accordance with the difference, change, and/or magnitude of the inductance, sensor circuit 128 may deduce (e.g., detect, sense, measure) and report the presence of the firearm in the holster. Sensor circuit 128 may further detect the magnitude of the inductance of the circuit, as discussed above, when the firearm is not present in the holster and report the absence of the gun from the holster.

In another implementation, coil 130/200 may couple to a capacitor (not shown) to form an LC tank circuit. The signal provided by sensor circuit 128 causes the LC tank circuit to resonate (e.g., oscillate). Sensor circuit 128 may measure the frequency of resonation to determine whether the firearm is positioned in the holster. Sensor circuit 128 and/or processing circuit 112 may use the measured frequency of oscillation to determine the inductance of coil 130/200.

The frequency of oscillation of the LC tank circuit is governed by the formula $f=1/(2\pi*\sqrt{(LC)})$. The value of the capacitance, C, is known and fixed, so the frequency of oscillation of the LC tank circuit is determined by the value of the inductance of coil 130. While firearm 142 is absent from holster 150/650, the impedance of the LC tank circuit, L, is a first value L1. See FIG. 4. While the inductance of the LC tank circuit is L1, the tank circuit oscillates at a first frequency f1. While firearm 142 is positioned in holster 150/650, see FIG. 5, the metal of firearm 142 interacts with the electromagnetic field from coil 130/200 and thereby alters the value of the inductance of the LC tank circuit. While firearm 142 is inserted in to holster 650 and proximate to coil 130/200 the inductance of the LC tank circuit is a second value L2. While the inductance of the LC tank circuit is L2, the tank circuit oscillates at a second frequency f2.

Detector 110/610 may detect a difference (e.g., |f1−f2|, f1−f2, f2−f1) in frequency and/or a difference in parallel resistance of the LC tank circuit to determine whether firearm 142 is present in holster 150/650. Or, detector 110/610 may use the measured frequency and/or resistance of the LC tank circuit (e.g., f1, f2) and the known value of the capacitance of the LC tank circuit to determine the measured inductance (e.g., L1, L2) and whether firearm 142 is in or out of holster 150/650.

A firearm (e.g., gun) is a weapon that launches a projectile (e.g., bullet, shell) to deliver a force of impact to an object via the projectile. Conventional firearms include pistols (e.g., handguns) and rifles (e.g., long arms, shotguns, carbines) whether single shot, semiautomatic, or fully automatic. Many conventional firearms use combustion of a pyrotechnic to launch the projectile.

Figure 6:
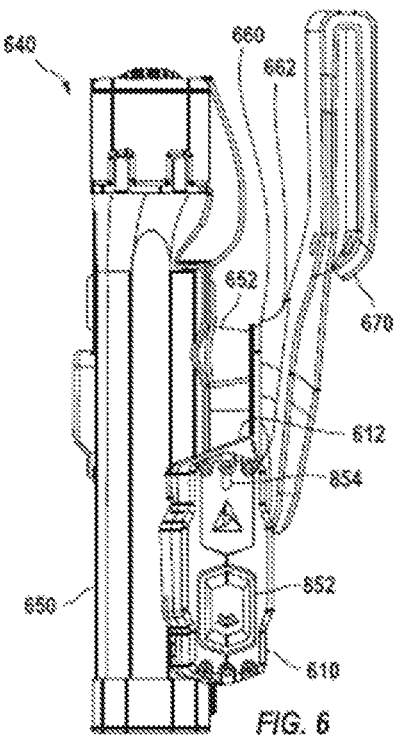
FIG. 6 is a view of an implementation of the system for providing a notice of FIG. 1 with a first implementation for mounting the detector proximate to the holster.
Figure 7:
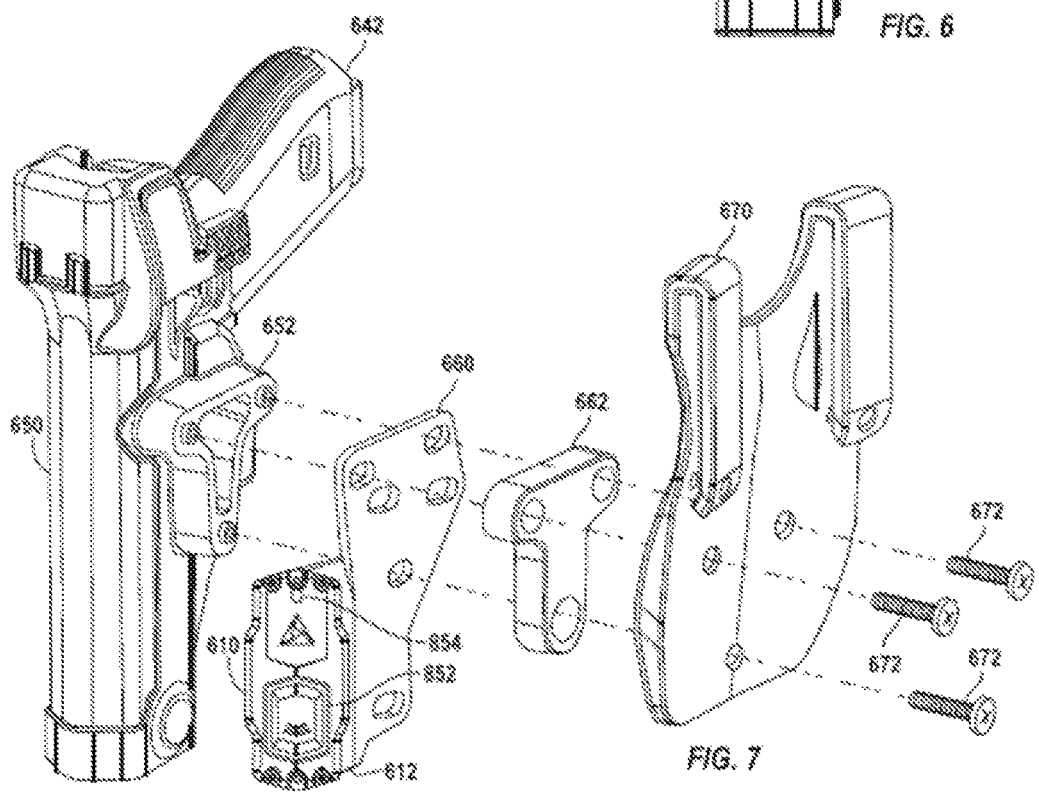
FIG. 7 is an exploded view of the implementation of the system for providing a notice of FIG. 6.
Figure 8:
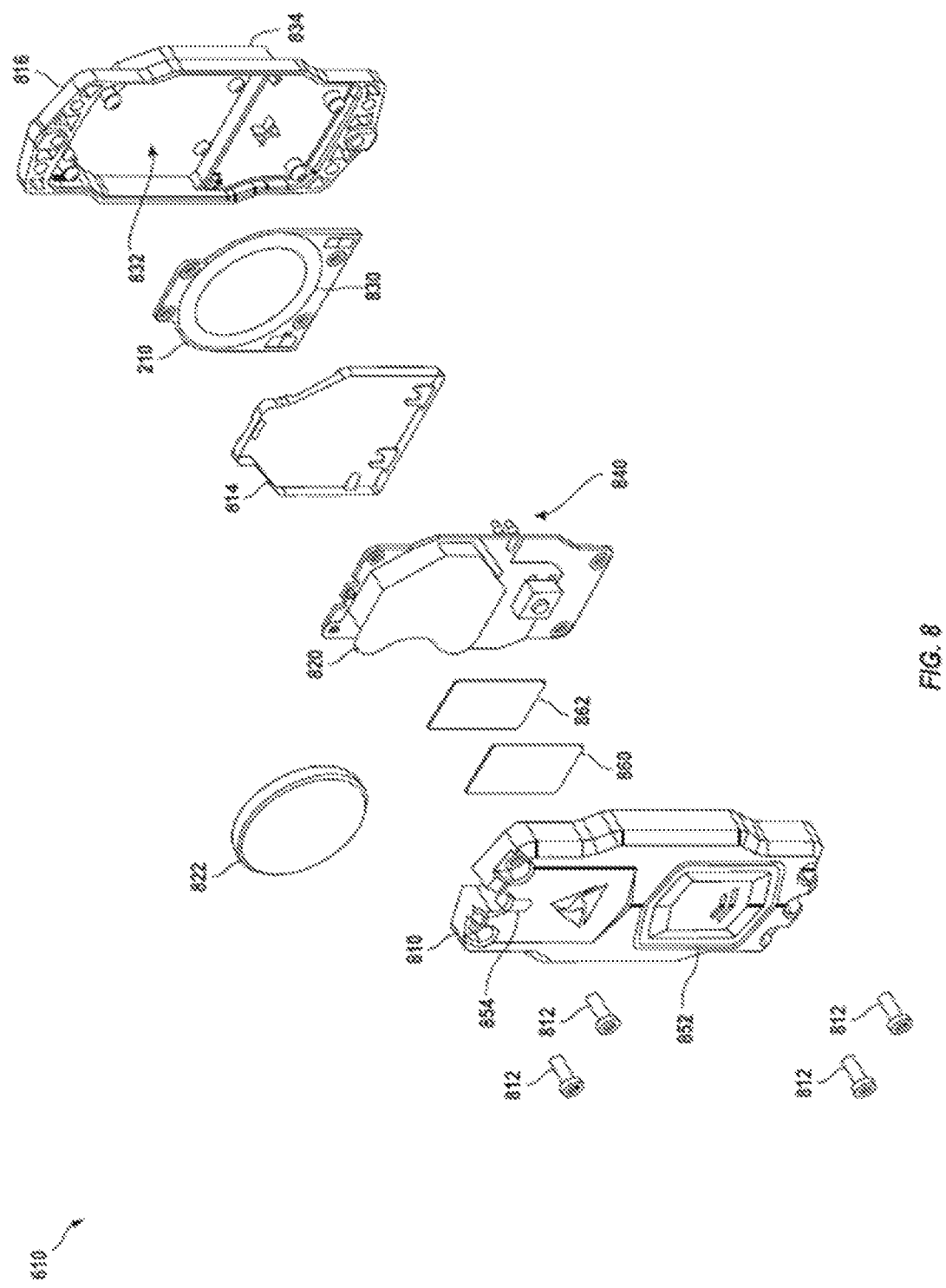
FIG. 8 is an exploded view of the implementation of detector of FIGS. 6 and 7.
Figure 10:
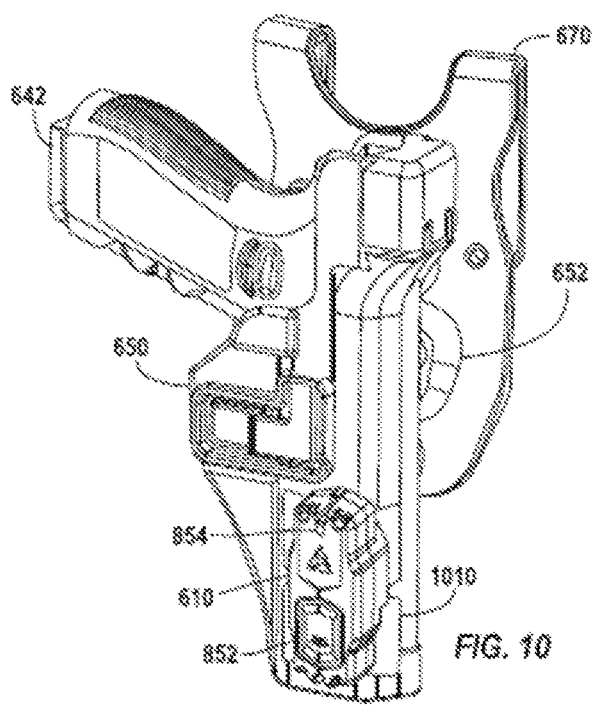
FIG. 10 is a view of an implementation of the system for providing a notice of FIG. 1 with a second implementation for mounting the detector proximate to the holster.
Figure 11:
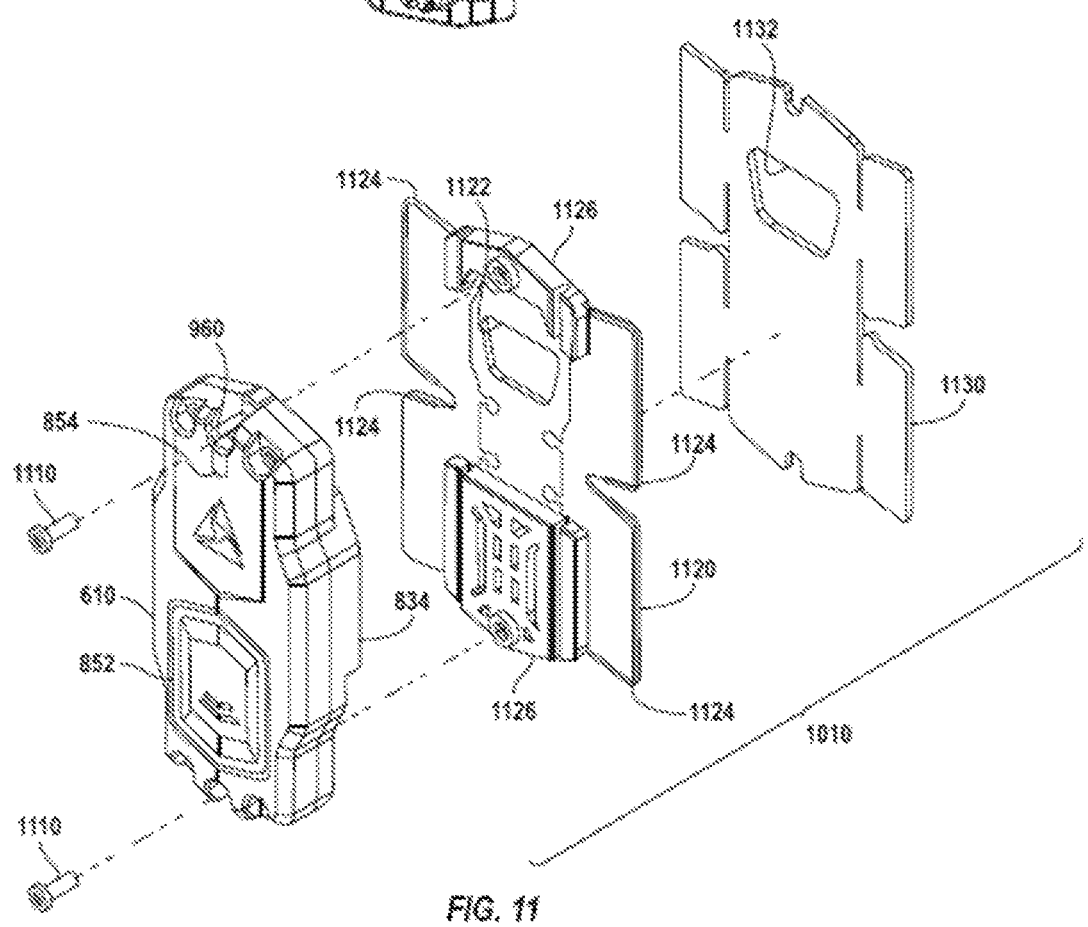
FIG. 11 is an exploded view of the second implementation for mounting the detector of FIG. 10.
Figure 12:
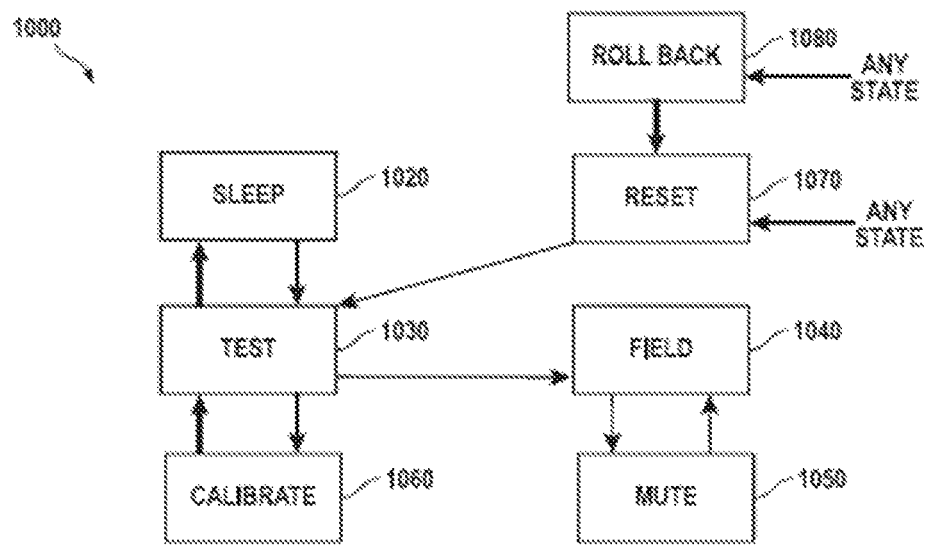
FIG. 12 is a state diagram of the operating modes of the detectors of FIGS. 1 and 6-11.
Figure 13:
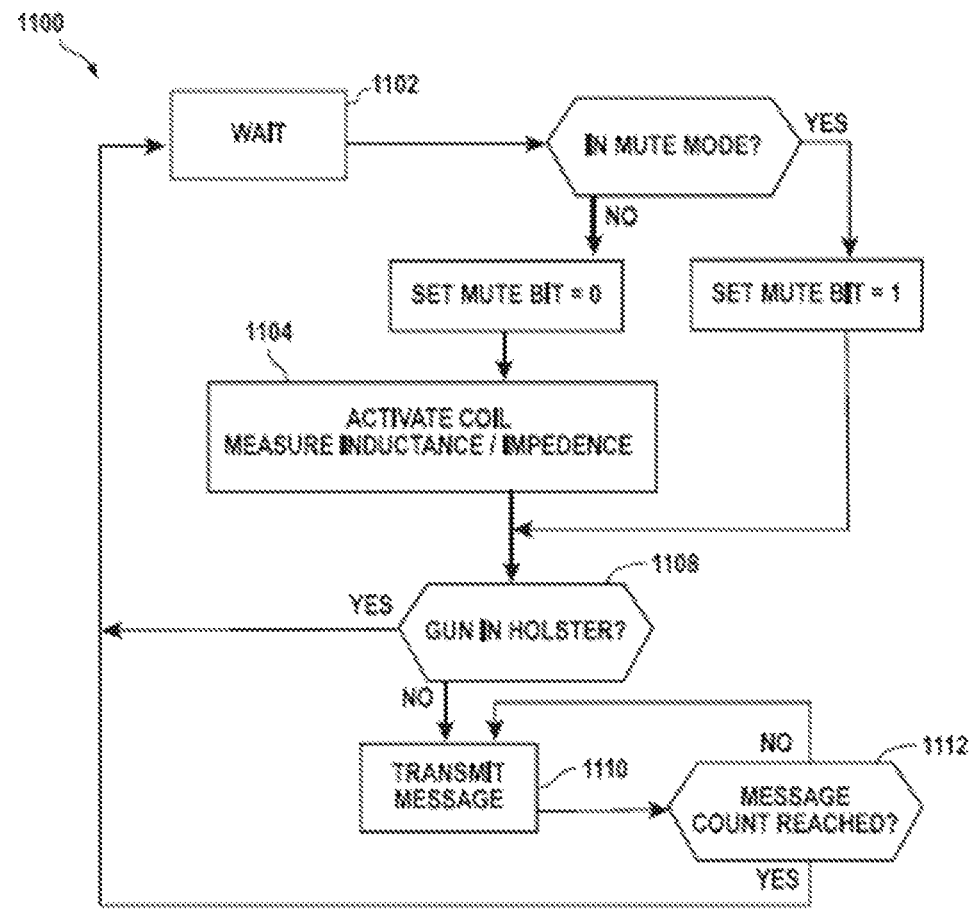
FIG. 13 is a state diagram of a method for monitoring the presence or absence of a firearm.

Most conventional firearms are formed, at least partially, of metal. Most conventional firearms include at least a metal barrel. For example, firearm 642, shown in FIGS. 6-7 and 10, is a conventional firearm with a metal barrel. The metal of a firearm may interact with the electromagnetic field generated by a coil. A sensor circuit may detect the change in the electromagnetic field that results when the metal of a firearm is proximate to the coil that is generating an electromagnetic field.

A holster is a case (e.g., holder) that holds a firearm. Conventional holsters for handguns have an opening to facilitate quick removal and insertion of the handgun out of and into the holster respectively. The shape of the holster generally conforms to the shape of the firearm (e.g., barrel, finger guard). A holster may be formed of any material. Common materials include leather and plastics. The material of many holsters, such as those formed of leather or plastics, permit the passage of an electromagnetic field through the walls of the holster so that a sensor circuit may detect the presence or absence of a metal portion of a firearm inside the holster.

For example, holster 650 of firearm system 640, shown in FIGS. 6-7 and 10, is suitable for accepting and holding firearm 642 and for mounting holster system 600 to a user's belt. Firearm system 640 includes holster 650 and belt mount 670. Holster 650 includes mount 652 for mounting to belt mount 670 to couple holster 650 to belt mount 670. As discussed in further detail below, holster 650 may be decoupled from belt mount 670. Plate 660 and spacer 662 may be positioned between mount 652 and belt mount 670. Mount 652 may be coupled to plate 660 so that plate 660 and spacer 662 are positioned and retained between mount 652 and belt mount 670.

In other implementations, belt mount 670 may be replaced with a thigh mount, a MOLLE mount, and a quick-detach mount.

Mount 652 and belt mount 670 may have structures (e.g., holes) that correspond to each other to facilitate mounting belt mount 670 to mount 652 with retaining plate 660 and spacer 662 positioned in between.

While belt mount 670 is coupled to holster 650, holster 650 and belt mount 670 function as a single unit to hold firearm 642 and to mount to a user's belt. While mounted to the user's belt, firearm 642 may be withdrawn and inserted into holster 650.

While plate 660 and spacer are mounted between mount 652 and belt mount 670, holster 650, mount 652, plate 660, spacer 662, and belt mount 670 function as a single unit to hold firearm 642 and to mount to a user's belt. Firearm 642 may be withdrawn and inserted into holster 650 while these components are coupled to each other. Plate 660 and/or spacer 662 do not interfere with removing and/or inserting firearm 642 out of or into holster 650.

Plate 660 includes positioner 612. Detector 610 may mount to positioner 612. Positioner 612 positions and holds (e.g., maintains) detector 610 proximate to holster 650, so that the electromagnetic field from detector 610 passes through the wall of holster 650 to determine, via measuring inductance, impedance, and/or frequency, whether firearm 642 is inserted into holster 650 or withdrawn from holster 650.

In another implementation, very high bond ("VHB") mount 1010 positions detector 610 with respect to holster 650 so that the electromagnetic field from detector 610 passes through the wall of holster 650 to determine, via measuring inductance, impedance, and/or frequency, whether firearm 642 is inserted into holster 650 or withdrawn from holster 650.

VHB mount 1010 includes mount 1120 and VHB tape 1130. Detector 610 mechanically mounts to mount 1120. Mount 1120 includes flexible tabs 1124. Tabs 1124 may flex to conform to the exterior surface of holster 650. Base 1126 is formed of a rigid material to maintain detector 610 positioned with respect to mount 1120 and opening 1122. VHB tape 1130 is a very high bond tape that provides a strong adhering force between mount 1120 and holster 650. The shape of VHB tape 1130 is similar to the shape of mount 1120 including tabs 1124. VHB tape 1130 includes opening 1132 that substantially aligns with opening 1122 when VHB tape 1130 adheres to mount 1120 and holster 650. Opening 1122 and 1132 may reduce interference with the electromagnetic field that issues from coil wall 834 to detect the presence or absence of firearm 642 in holster 650. Opening 1122 and 1132 may further operate as a window to permit the serial number of detector 610 to be viewed prior to mounting.

After mount 1120 and VHB tape 1130 are coupled to holster 650, detector 610 may be decoupled from mount 1120 to be service or replaced. Mount 1120 and VHB tape 1130 remain coupled to the exterior of holster 650. With effort, mount 1120 and VHB tape may be decoupled from holster 650.

Processing circuit 112, memory 114, user interface 116, communication circuit 122, real-time clock 124, authentication circuit 126, sensor circuit 128, coil 130, control 118, indicator 120, firearm system 140, and holster 150 may perform the functions and include the structures of a processing circuit, a memory, a user interface, a communication circuit, a real-time clock, an authentication circuit, a sensor circuit, a coil, a control, an indicator, a firearm system, a firearm, and a holster respectively as discussed above.

In operation, processing circuit 112 controls, performs, or directs most or all of the operations of detector 110. Processing circuit executes a program stored in memory 114 to perform or control the functions of detector 110. In an implementation, memory 114 is implemented as a flash memory. Processing circuit 112 responsive to the program enters various states of operation (e.g., modes) to perform particular functions. Processing circuit 112 may perform method 1000 and/or 1100 in whole or part as discussed below. In each mode, processing circuit 112 performs or controls the performance of specific operations. The modes and the operations performed in the various modes are discussed below.

Processing circuit 112 receives information for a user via user interface 116. In particular, as the user operates or controls control 118, control 118 sends signals to processing circuit 112. Responsive to the signals, processing circuit 112 performs functions, controls the performance of a function, and/or changes from one mode to another mode. In an implementation, control 118 is a switch (e.g., electromechanical) that is manually operated by a user.

Processing circuit 112 also provides information to the user responsive to the operation and/or modes of detector 110. Processing circuit 112 provides signals to indicator 120 responsive to performance of an operation, entering a state of operation, exiting a state of operation, and/or occurrence of a change in a state of operation. In an implementation, indicator 120 is an LED. Processing circuit 112 may provide a signal that turns the LED on and off to provide information to the user. Processing circuit 112 may turn the LED on and off at a frequency of operation or in accordance with a pattern to provide information to the user and/or to indicate a state of operation of detector 110. A pattern and/or color of light provided by the LED may indicate particular information to a user.

In another implementation, indicator 120 includes or exclusively provides an audible sound or tactile feedback to provide the user information. Processing circuit 112 may control a sound producing indicator (e.g., buzzer) or tactile producing indicator (e.g., vibrator) in the same manner as the LED including providing sound or vibrations in accordance with patterns.

Sensor circuit 128 cooperates with coil 130 to detect the presence or absence of firearm 142 in holster 150. Sensor circuit 128 may drive coil 130 with a signal (e.g., AC, DC, impulse), as discussed above, so that coil 130 generates an electromagnetic field. Sensor circuit 128 detects (e.g., senses, measures) the inductance, impedance, and/or frequency of oscillation of the circuit that includes coil 130. When metal from firearm 142 is not proximate to coil 130, sensor circuit 128 detects a first magnitude of inductance, impedance, and/or frequency. When metal from firearm 142 is proximate to coil 130, sensor circuit 128 detects a second magnitude of inductance, impedance, and/or frequency. Sensor circuit 128 may report the values (e.g., absolute, actual) of the first magnitude and the second magnitude and/or a change in the magnitude.

Processing circuit 112 may receive reports from sensor circuit 128. Processing circuit 112 may use the information that is detected by sensor circuit 128 to determine whether firearm 142 is in holster 150 or whether holster 150 has been withdrawn from holster 150.

Responsive to determining that firearm 142 had been withdrawn from holster 150, processing circuit 112 may instruct communication circuit 122 to transmit a message. A message transmitted by communication circuit 122 may include information such as an identifier (e.g., serial number) of detector 110 and/or an identity of the user, as discussed above. An identifier of detector 110 may be unique. The message may further include the status of firearm 142 with respect to holster 150 (e.g., withdrawn, inserted), a cryptographic signature, a time-stamp, a state of the battery (e.g., power level) of detector 110, the mode of detector 110 (e.g., test, calibrate, field, mute), the serial number of firearm 142, and/or the version of the software of detector 110. In an implementation, the message transmitted by communication circuit 122 includes all or some of the above information.

The message transmitted by communication circuit 122 may be received by any electronic device capable of receiving messages that is in communication with communication circuit 122. The message may be transmitted wirelessly. The electronic device receiving the message may analyze the information provided in the message. Responsive to the content of the information in the message, an electronic device may perform an operation.

In an embodiment, body cameras, vehicle cameras, wireless microphones and/or other recording systems may receive a message from detector 110. Responsive to determining that the message reports that a weapon has been withdrawn from a holster, the recording system may (e.g., permissive trigger) start capturing and/or recording information. A recording system may use other information from a message to determine whether or not to start recording. For example, if the information in the message shows that detector 110 is in the mute mode (e.g., mute bit set to 1), discussed below, the recording system may decide to not start recording. If the identifier of detector 110 or the user of detector 110 does not match a list of permitted detectors or users, the recording system may elect to not begin recording.

Communication circuit 122 may transmit a message upon detecting that firearm 142 has been placed into holster 150. A recording system may elect (e.g., permissive trigger) to stop recording upon receiving such information. A recording device may elect to continue recording even though firearm 142 has been returned to the holster so that the user must manually terminate recording.

Communication circuit 122 may also receive information. For example, communication circuit 122 may receive data for updating the software of detector 110. Communication circuit 122 may receive information as to the identity of the user of detector 110 (e.g., holster 150, firearm 142). Communication circuit 122 may receive information as to the serial number of firearm 142.

Real-time clock 124 may provide time, day, and/or date information. Information from real-time clock 124 may be included in a message transmitted by communication circuit 122. Real-time clock 124 may also provide time information for logging information as discussed above. The present time of real-time clock 124 may be changed. Communication circuit 122 may receive a new time and the present time of real-time clock 124 may be set to the new time. Setting real-time clock 124 to a new time may be performed during manufacture, to synchronize the time maintained by two or more detectors 110, or to correct an error in the time maintained by real-time clock 124. Real-time clock 124 may track time as universal time coordinated ("UTC"), yet report time in a local format (e.g., UTC-7 for Arizona). Time reported by real-time clock 124 may account for local time zone and/or daylight savings time. Real-time clock 124 may also report time in UTC format and a receiving device may make any adjustments to determine local time. Processing circuit 112 may perform some or all of the functions of real-time clock 124.

The time maintained by real-time clock 124 may be updated in the field when detector 110 communicates with another system that includes a more accurate or more frequently updated clock. For example, the time of real-time clock 124 may be updated to match the time of a body-worn camera when detector 110 communicates with the body-worn camera. In another example, the time of real-time clock 124 may be updated to match the time of a handheld device (e.g., cell phone, smart phone) when detector 110 communicates with the handheld device.

Processing circuit 112 may store information regarding the operation and status of detector 110. As discussed above, stored information may be referred to as a log. Information that is logged may be stored in memory 114. Log information may be retrieved. Communication circuit 122 may transmit log information to another electronic device, such as a server. Log information may be used to analyze the performance and operation of detector 110. Log information may be used to detect faults in the operation of detector 110.

Information stored in a log may include events such as removal of firearm 142 from holster 150, insertion of firearm 142 into holster 150, activation of mute operation (e.g., mute mode), deactivation of mute operation, reset of detector 110, setting of time of real-time clock 124, a change in configuration of detector 110, receiving and/or installing a software upgrade, reverting to an earlier version of software, occurrence of a system fault either hardware or software, transmission of a message by communication circuit 122, receipt of a message by communication circuit 122, battery energy level, report of battery energy level, battery change, magnitude of inductance and/or impedance when firearm 142 is proximate, magnitude of inductance and/or impedance when firearm 142 is not proximate, receipt of user identity, successful authentication, unsuccessful authentication, state of operation, and/or receipt of serial number of firearm 142.

Information stored in a log may be referred to as an entry. A single type of information and/or information related to a single event or occurrence may be stored in an entry. Each entry may include a time-stamp of when the entry was recorded. Real-time clock 124 may provide the time-stamp. The time-stamp may include time, day, and/or date as discussed above.

Authentication circuit 126 may store keys used for encryption. Authentication circuit 126 may encrypt and/or decrypt data. Authentication circuit 126 may receive data from communication circuit 122 for decrypting. Authentication circuit 126 may provide encrypted data to communication circuit 122 for transmission. Authentication circuit 126 may cryptographically sign data prior to transmission.

Authentication circuit 126 may provide information for authenticating (e.g., confirming) the identity of detector 110. Authentication circuit 126 may request information for authenticating the identity of another system (e.g., server, recording system). A server may request that detector 110 authenticate its identity before the server communicates with detector 110. For example, a server may request that detector 110 authenticate its identity prior to providing detector 110 with sensitive data, such as a software update. Detector 110 may request that a server authenticate its identity prior to providing log entries to the server.

In an implementation of detector 110, referring to FIGS. 6-11, detector 610 includes front housing 810, screws 812, holes 960, circuitry 840, battery holder 820, battery 822, back housing 816, coil 830, shield 814, NFC tag 860, and shield 862. Front housing 810 may include user interface 850. User interface 850 may include indicator 854 (e.g., LED) and control 852 (e.g., user-operated switch). Back housing 816 may include coil cavity 832, and coil wall 834.

Circuitry 840 may include processing circuit 112, memory 114, communication circuit 122, real-time clock 124, authentication circuit 126, and sensor circuit 128. Battery holder 820 holds battery 822. Battery 822 provides power to operate circuitry 840, coil 830, indicator 854, and control 852. Screws 812 coupled front housing 810 to back housing 816 to enclose circuitry 840, battery holder 820, battery 822, coil 830, shield 814, NFC tag 860, and shield 862.

Shield 814 is positioned around a perimeter of PCB 210 and therefore around an edge of coil 830. Coil 830 is positioned in coil cavity 832 to position coil 830 proximate to coil wall 834. Shield 814 remains positioned around an edge of coil 830 while coil 830 is positioned in coil cavity 832. While detector 610 is in use with a holster, coil wall 834 is position proximate to holster 650 so that the electromagnetic waves from coil 830 pass through the wall of holster 650 to detect the presence or absence of metal. Detector 610 couples to positioner 612 to position coil wall 834 proximate to holster 650.

Sensor circuit 128 and/or a processing circuit of sensor circuit 128, or processing circuit 112, may include a temperature sensor. Information regarding temperature may be used to correct (e.g., adjust, compensate for) operation of sensor circuit 128 or other components that varies with temperature. For example, coil 200 may be formed on a PCB as discussed above. The electrical properties of coil 200 change over temperature. Further, when sensor circuit 128 is implemented using an LDC, the LDC receives a clock from an oscillator. The oscillator may be temperature sensitive thereby affecting the operation and measurements made by the LDC. A coil and an oscillator used as a clock may be characterized to determine how they vary over temperature. Processing circuit 112 may use the current temperature and the characterization data to adjust operation to compensate for temperature.

Near-field-communication ("NFC") tag 860 may communicate with a reader via wireless near-field communication. NFC tag 860 may be passive or active. NFC tag 860 may provide information to a reader. In an implementation, NFC tag 860 provides the serial number of detector 610 to the reader via NFC communication. NFC tag may operate independent of processing circuit 112, memory 114, communication circuit 122, user interface 116, sensor circuit 128, coil 130, real-time clock 124, and authentication circuit 126. Any device (e.g., smartphone, tablet, mobile computer, recharging station) may perform the function of an NFC reader. Shield 862 may shield NFC tag 860 from the electrical and electromagnetic noise produced by circuitry 840.

A user may operate control 852 to provide information to detector 610. A user may operate control 852 by pressing the releasing control 852. Pressing control 852 may provide a signal to processing circuit 112 as discussed above. Detector 610 may provide information to a user via indicator 854. Indicator 854 may provide information via illumination of a light. Indicator 854 may operate to provide a pattern of on-off flashes (e.g., blinks) of light to convey information. The pattern provided by indicator 854 may depend on the operating state of detector 610.

Processing circuit 112 may execute a program to perform the functions of an operating state. As discussed above, an operating state may be referred to as a mode of operation or simply a mode. In an implementation, the operating states of detector 110 and/or 610 may include sleep 1020, test 1030, field 1040, mute 1050, calibrate 1060, reset 1070, rollback 1080.

Processing circuit 112 may cooperate with or received signals from control 120/852 to exit or enter a state of operation. Processing circuit 112 may provide information to a user via indictor 120/854 upon entering or while operating in a state. Processing circuit 112 may use a timer or may measure an elapse of time using the time provided by real-time clock 124 to enter and/or leave a state of operation.

In state diagram of method 1000 of FIG. 10, sleep 1020 is a low power state in which most of the circuits of detector 160/610 are powered down to save battery power. In an implementation, the only circuitry that is active is the portion of processing circuit 112 that monitors control 118 to detect when control 118 has been pressed. Operation transitions into sleep 1020 from test 1030 after the expiration of a period of time. In an implementation, the period of time is 30 seconds. Operation moves from sleep 1020 to test 1030 responsive to activation of control 118. In an implementation, indicator 120/854 (e.g., LED) blinks three times with a green light to confirm the transition from sleep 1020 to test 1030.

In test 1030, the circuits of detector 160/610 are powered up so that a user may verify the proper operation of detector 160/610. In test 1030, a user may verify that detector 160/610 detects the insertion of firearm 142 into holster 150/650 and removal of firearm 142 from holster 150/650. When firearm 142 is inserted into holster 150/650, indicator 120/854 (e.g., LED) provides light that is visible to the user. When firearm 142 is removed from holster 150/650, indicator 120/854 ceases to provide light.

As stated above, operation stays in test 1030 for a duration of time before returning to sleep 1020. In an implementation, operation moves from test 1030 to sleep 1020 after a 30 second period of time. Thirty seconds is enough time for a user to insert and remove firearm 142 from holster 150/650 several times. If indicator 120 indicates proper detection of insertion and removal, a user may press control 118 to move operation from test 1030 to field 1040. In an implementation, control 118 must be pressed with a long press of 5 seconds or greater for operation to move from test 1030 to field 1040.

While in test 1030, if indicator 120/854 shows that detector 160/610 is not properly detecting the insertion and removal of firearm 142, a user may elect to calibrate detector 160/610. While in test 1030, a user may move into calibrate 1060 by pressing control 118 with a double press. In an implementation, a double press is one press on control 118, a pause, then a second press on control 118. The length of the pause may have an upper boundary.

In calibrate 1060, detector 110/610 determines the magnitude of the inductance or impedance that indicates that the weapon is in and/or out of the holster. In one implementation, detector 110/610 performs several readings of the inductance and/or impedance while the firearm 142 is withdrawn from holster 150/650. Detector 110/610 averages the value of the measure inductance and/or impedance to determine a base-line value of inductance and/or impedance. The base-line value is subtracted from readings performed in field 1040. A change from the base-line value, either more or less, indicates that firearm 142 is in holster 150/650.

In another implementation, detector 110/610 performs several readings while firearm 142 is in holster 150/650 and averages the values to create a base-line value for when firearm 142 is in holster 150/650. Detector 110/610 also performs several readings while firearm 142 is out of holster 150/650 and averages the values to create a base-line value for when firearm 142 is out of holster 150/650. While in the operating state field 1040, detector 110/610 uses the base-line values for firearm 142 being in and out of holster 150/650 to determine when firearm 142 is in or out of holster 150/650.

In an implementation, indicator 120/854 blinks three times with a green light after the double press on control 118 to confirm that operation has moved from test 1030 to calibrate 1060. Once calibration is complete, indicator 120/854 blinks three times with a green light to show the transition from calibrate 1060 back to test 1030.

While in operating state test 1030, a user may use control 118 to move from operating state test 1030 to operating state field 1040. A user may press control 118 with a long-press to initiate the change from test 1030 to field 1040. In an implementation, a long press is a press that is greater than 5 seconds, but less than 25 seconds. In an implementation, indicator 120/854 blinks 3 times with a green light to indicate the transition from test 1030 to field 1040.

In the operating state field 1040, detector 110/610 performs method 1100 to monitor the presence or absence of firearm 142 in holster 150/650. Method 1100 includes operating states wait 1102, activate 1104, measure 1106, present 1108, transmit 1110, and count 1112.

In wait 1102, detector 110/610 waits for a period of time. While in wait 1102, the circuits of detector 110/610 are in a low power state to save energy to prolong the life of the battery. At the end of the period of time, detector 110/610 transitions to operating state activate 1104.

In activate 1104, detector 110/610 activates the coil and measures inductance, impedance and/or frequency of oscillation to detect the presence or absence of firearm 142 in holster 150/650.

In another implementation, the Texas Instruments inductance-to-digital integrated circuit LCD1101 controls the operation of coil 130/200, measures the frequency, inductance, and/or impedance, and reports a digital value to processing circuit 112.

After activate 1104 has activated coil 130/200 and returns a value of the frequency of the LC tank circuit, the inductance of coil 130/200, and the impedance of coil 130/200 and/or LC tank circuit, operation moves to present 1108.

In operating state present 1108, detector 110/610 uses the information determined in activate 1104 to determine whether firearm 142 is present in holster 150/650 or whether firearm 142 is absent from holster 150/650. In an implementation, processing circuit 112 compares the value provided by the LDC1101 integrated circuit or the value of the measured frequency of the LC tank circuit, or the measured value of the inductance of the LC tank circuit to one or more base-line values to determine whether firearm 142 is in or out of holster 150/650. If firearm 142 is present in holster 150/650, execution of method 1100 moves to operating state wait 1102. If firearm 142 is not present in holster 150/650, execution moves to transmit 1110.

In transmit 1110, detector 110/610 transmits a message that contains some or all of the information discussed above including that firearm 142/642 has been removed from holster 150/650. Any recording system that receives the message may determine that the information provided by the message indicates that firearm 142/642 has been removed from holster 150/650. A recording system may (e.g., permissive trigger) start to capture and/or record information responsive to such information in the message. After transmitting the message, execution moves to operating state count 1112.

In operating state count 1112, detector 110/610 determines whether the message has been transmitted a certain number of times. In an implementation, the message is transmitted once per second for 30 seconds. If the message has been transmitted the predetermined number of times, execution moves to operating state wait 1102. If the message has not been transmitted the predetermined number of times, execution returns to operating state transmit 1110.

During the time that detector 110/610 remains in field 1040, indicator 120/854 may be shut off to conserve energy and to not blink when dark thereby disclosing the position of the user.

In the event that a user wishes to remove firearm 142 from holster 150/650 without requesting that any cameras or other recording devices start recording, the user may put detector 110/610 in the mute 1050 operating state. For example, an officer may need to remove firearm 142 from holster 150/650 temporarily upon entering a court house. A user may request a transition from field 1040 to mute 1050 by pressing control 120/852 with a long press.

Detector 110/610 remains in the mute mode for a period of time (e.g., 30 seconds). At the expiration of the period of time, operation returns to field 1040. While in mute 1050, detector 110/610 performs method 1100; however, irrespective of whether firearm 142 is in or out of holster 150/650, the transmitted messages include a mute bit whose value is set to a one. Setting the mute bit to a one indicates that the user as requested the mute mode and the state of operation is presently in mute 1050. Cameras or other recording devices ignore messages that include a mute bit with the value set to a one. Operation remains in mute 1050 for the predetermined amount of time, thereby possibly repeatedly executing method 1100 several times.

While in mute 1050, indicator 120/854 blinks to indicate that operation is in mute 1050. However, additional information may be provided by indicator 120/854 while in mute 1050. For example, indicator 120/854 blinks with a red color if the battery is low and with a green color if the battery level is not low (e.g., above a pre-determined level).

At any time and from any state of operation, a user may press control 120/852 for an extended long press (e.g., 25 seconds) to transition from whatever the present state of operation is (e.g., sleep 1020, test 1030, calibrate 1060, field 1040, mute 1050) to reset 1070 operating set. Indicator 120/854 confirms the transition to reset 1070 by blinking with a blue color.

While in reset 1070, detector 110/610 performs operations to reset all components of indicator 120/854 to a known state. After setting all components to a known state, detector 110/610 restarts operation and enters operating state test 1030.

At any time and from any state of operation, a user may press control 120/852 for an even longer extended long press (e.g., 40 seconds) to transition from whatever the present state of operation is to rollback 1080 operating set. Indicator 120/854 confirms the transition to rollback 1080 by alternately blinking with a blue and green color.

While in rollback 1080, detector 110/610 selects for execution a previous version of software. Processing circuit 112 executes a stored program (e.g., software, firmware) stored in memory 114 to perform the functions of detector 110/610. The stored program may be updated by receiving new software via wired or wireless communication. Detector 110/610 may wirelessly communicate with a hand-held device (e.g., smartphone, tablet) or a server to receive updated software. Detector 110/610 may store two or more version of software including the factory version loaded into detector 110/610 at manufacture. In the event that the present version of software does not operate properly (e.g., bug, corruption of memory 114), a user may activate operating state rollback 1080 to return to a prior version of the software.

Once the prior version of the software has been selected as the present version of software, operation moves to reset 1070 to reset operation executing the different version of software.

In an implementation, field 1040 may perform a further method, in addition to method 1100, to periodically transmit a status message that is different and separate from the message transmitted in transmit 1110. A status message may include information regarding the status of detector 110/610. A status message may exclude information regarding the status of firearm 142/642 (e.g., withdrawn, inserted). In an implementation, the status message is transmitted every 40 seconds. The status message includes information regarding the status of the battery (e.g., charge level).

Other implementations include the implementations provided below.

A system for positioning a detector to detect removal of a provided firearm from a provided holster, the holster includes a mount and a belt mount, the mount coupled to the holster, the mount configured to couple to the belt mount, the system comprising: a plate; the detector; and a positioner, the positioner configured to couple to the detector and to the plate; wherein the plate is configured to be positioned between the mount and the belt mount prior to coupling the mount to the belt mount; coupling the mount to the belt mount retains the plate between the holster and the belt mount; coupling the positioner to the detector and to the plate while the plate is retained between the mount and the belt mount positions the detector proximate to a wall of the holster; and while the detector is proximate to the wall of the holster, an electromagnetic field of the detector passes through the wall to detect removal of the firearm from the holster Aspects of this disclosure also relate to a weapon detector configured to operate in a placement mode, such that when mounted on a mounting system, the detector may be traversed over a surface of a holster to determine an acceptable or optimal location of the holster for placing the detector. Aspects further relate to a detector configured to be placed at an optimal position on a holster, and be selectively switched to a mode of operation, such that the detector may detect the removal of a weapon from a holster after being positioned in the optimal location. The removal of the weapon from the holster may cause the detector to transmit an electronic signal configured to activate another device as discussed herein.

In one embodiment, the mounting system is a universal mounting system, such that in combination with the placement mode, the detector may be optimally mounted on the surface of any one of a plurality of holsters, each having different surface characteristics. The detector comprises a computer-readable medium comprising computer-executable instructions, that when executed by a processor perform at least allowing the detector to be selectively entered into a placement mode that is configured to locate an acceptable or optimal placement location for the mounting system on any of the plurality of holsters. In one embodiment, the mounting system comprises an adhesive layer. In another embodiment, the detector's sensor may comprise a sensor configured to obtain High-Resolution Inductance ("LHR") values as part of determining a placement location on any of the plurality of holsters. In yet another embodiment, LHR values are also utilized to detect removal of the firearm from the holster once the detector is placed in an acceptable location on the holster.

Figure 14:
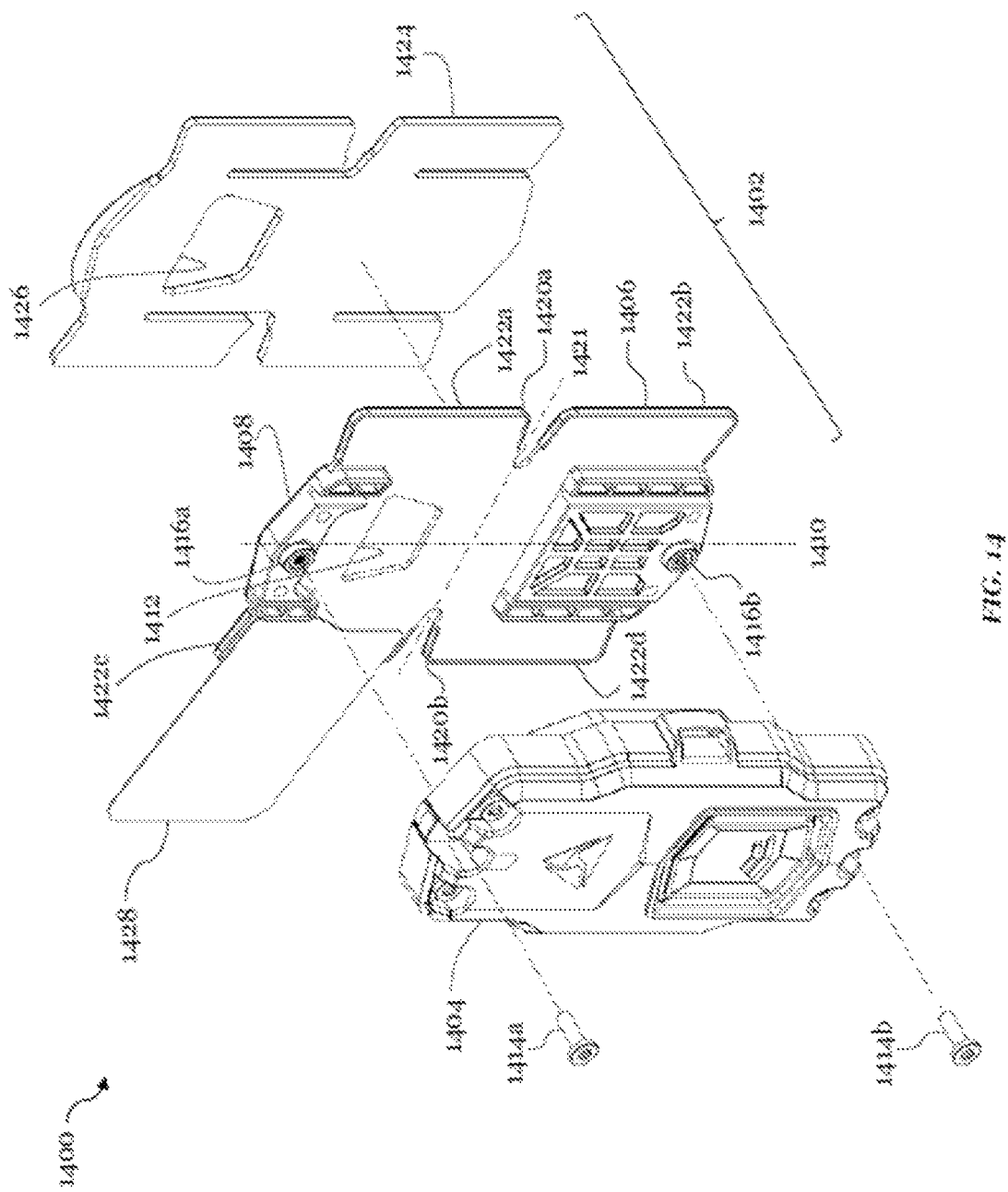
FIG. 14 is an exploded view of an embodiment for mounting the detector.

FIG. 14 depicts a detector system 1400 in accordance with one example embodiment. Detector system 1400 may comprise a mounting system, such as mounting system 1402 configured to mount a detector, such as detector 1404, to a holster (not shown). In certain implementations, detector 1404 may be similar or identical to detector 610 of FIG. 11. In one embodiment, mounting system 1402 comprises a unitary mount, such as mount 1406. Mount 1406 may comprise a central region or spine 1408. In one embodiment, spine 1408 may be substantially rigid wherein substantially rigid means the spine retains its planar form parallel to an axis (such as axis 1410) when mounting a detector, such as detector 1402, to a holster.

In one embodiment, spine 1408 maintains a fixed distance between detector 1404 and a holster, such as holster 150 (depicted in FIG. 1), important for detection accuracy. In yet another embodiment, the spine is not substantially rigid. Spine 1408 may include an inner perimeter 1412 defining a hole. In one embodiment, inner perimeter 1412 is shaped to provide an inspection window that permits the visual inspection of unique identifying information located on a surface of detector 1404.

In the illustrated embodiment, spine 1408 further comprises fastening mechanisms to permit mounting of detector 1404 to unitary mount 1406. In one embodiment screws 1414*a* and 1414*b* may cooperate with features 1416*a* and 1416*b* respectively to fasten detector 1404 to mount 1406. Those skilled in the art will appreciate that other fastening mechanisms may be utilized, including but not limited to ferules, threaded inserts, snap fits, ultrasonic welding, and/or combinations thereof.

A unitary mount may include one or more flexible extensions. As one example, mount 1406 is depicted with flexible extension 1420*a* and flexible extension 1402*b* extending away from spine 1408.

In one embodiment, flexible extensions 1420*a* and 1420*b* are homogeneous in composition and therefore exhibit the same or similar elastic modulus with one another. In another embodiment, flexible extensions 1420*a* and 1420*b* may be formed from a continuous piece of material and extend under spine 1408. In yet another embodiment, flexible extensions 1420*a*/1420*b* have one or more dissimilar mechanical properties.

In one embodiment, one or more flexible extensions, such as extensions 1420*a*/1420*b* may be positioned in two or more states. In a first state, such as, prior to being mounted to a holster (e.g., holster 140), flexible extensions 1420*a* and 1420*b* may be coplanar with spine 1408 and extend away from spine 1408 in the direction of axis 1421, which is perpendicular to axis 1410.

One or more flexible extensions may be flexed in a second state, such as, after being mounted to a holster (e.g., holster 150 as shown in FIG. 10). For example, flexible extension 1420*a* and flexible extension 1420*b* may be non-coplanar with spine 1408 when positioned in a second state. Furthermore, in a second state, such as after being mounted to holster 150, flexible extension 1420*a* may be non-coplanar with flexible extension 1420*b*. Although two flexible extensions are depicted in FIG. 14, one of ordinary skill in the art will appreciate that the number, size, and/or shape of flexible extensions 1420 may differ to better accommodate varying models of holsters.

One or more flexible extensions (e.g., extensions 1420*a*/1420*b*) may have a plurality of flexible regions. As shown in the illustrative example of FIG. 14, flexible extensions 1420*a* and 1420*b* may comprise flexible regions 1422*a*-1422*d* providing further compliance to surfaces with varying topography. The regions may be defined by (and/or may be partially separated from each other by) a portion of the outside perimeter of flexible extensions 1420*a* and 1420*b*.

In a first state (e.g., prior to being mounted to a holster), flexible regions 1422*a*-1422*d* may be coplanar with spine 1408. In a second state (e.g., after being mounted to a holster), flexible regions 1422*a*-1422*d* may take on a shape complimenting the surface of a holster (e.g., holster 150). Those of ordinary skill in the art may realize the number, size, and/or shape of flexible regions 1422*a*-1422*d* may differ to better accommodate varying models of holsters.

In one embodiment, mounting system 1402 further comprises an adhesion layer. As one illustrative example, an adhesive or adhesion layer may comprise VHB tape 1424. As shown herein, VHB tape 1424 may be similarly shaped to mount 1406. In another embodiment, VHB tape 1424 covers at least a portion of spine 1408 and flexible extensions 1420. In one embodiment, VHB tape 1424 may comprise a compressible foam layer further allowing unitary mount 1406 to conform to surfaces ranging in topographical properties.

VHB tape 1424 may also comprise inner perimeter 1426 defining a hole. As shown herein, inner perimeters 1412 and 1426 align when VHB tape 1424 is attached to the mounting system 1402, such that they permit visual inspection of unique identifying information on detector 1404. Inner perimeters 1412 and 1426 may also operate to reduce interference with detector 110/610 measurements.

In an embodiment not shown, an alternative adhesion system be used in lieu of and/or in addition to VHB tape 1424, such as including, but not limited to epoxy-based resins. Those of ordinary skill in the art would realize other fastening methods like ultrasonic or thermal welding also may be utilized without departing from the scope of this disclosure.

Mounting system 1402 may also comprise an adhesive-backed placement tag, such as placement tag 1428. Placement tag 1428 may be used to temporarily fix system 1400 to holster 150 after placement and during installation. Placement tag 1428 may have weaker bonding properties than VHB tape 1424.

Figure 15:
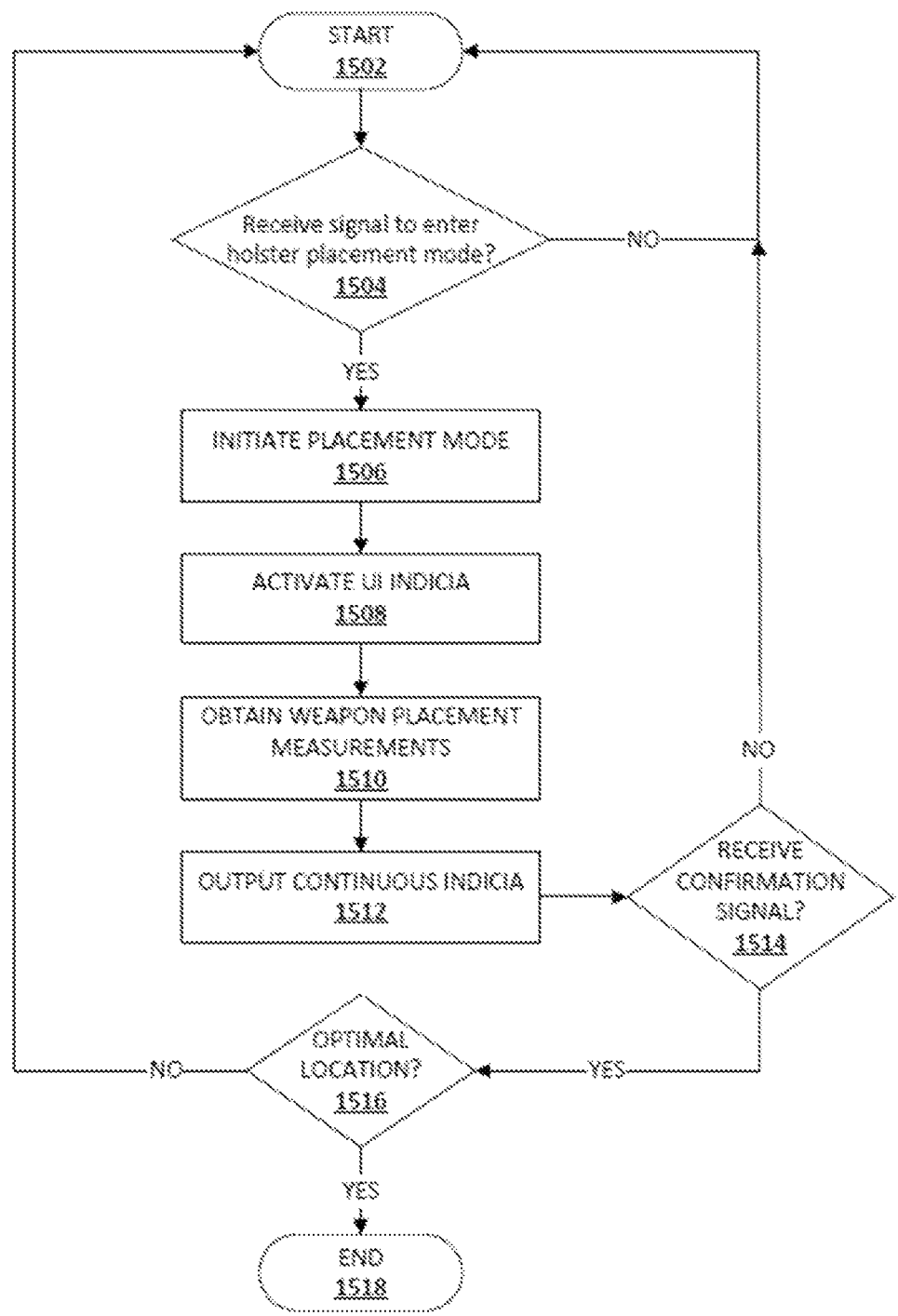
FIG. 15 is a state diagram of a method for identifying the optimal mount and detector location.

FIG. 15 shows illustrative flowchart 1500 which may be implemented to locate a proper placement location of a weapon detector, such as detector 1404 of FIG. 14, on a holster in accordance with one embodiment disclosed herein. As used herein, an optimal, proper, or acceptable placement location includes a location on a holster that will allow the detector to be mounted (via a mounting system) to the holster in a manner that permits the detector to detect a weapon being removed from the holster without interfering with removal or operation of the weapon. In one embodiment, the mounting system may be a universal mounting system such that it may be mounted to the surface of any one of a plurality of holsters that each have different surface characteristics. In one embodiment, a first holster may be manufactured by a first manufacturer, and a second holster is manufactured by a second manufacturer. In yet another embodiment, a first holster is a first model offered by a first manufacturer, and a second holster is a second model offered by the same first manufacturer. In a further embodiment, the mounting system is configured to be selectively mounted to either a first holster surface comprising a first material composition or a second holster surface comprising a second material composition.

In one implementation, one or more blocks and/or decisions of flowchart 1500 can be utilized of a method for placing detector (e.g., detectors 110/610/1404) and a mounting system (e.g. system 1402) at the optimal location on a holster (e.g., holster 150). Although flowchart 1500 is depicted with a plurality of blocks and decisions, those of ordinary skill in the art will appreciate that it merely represents one of many implementations, and additional or fewer blocks and/or decisions may be implemented. Further, the ordering of the components depicted in flowchart 1500 is merely for descriptive purposes unless otherwise expressly stated herein.

Exemplary flowchart 1500 of FIG. 15 may initiate with start 1502. In one embodiment, start 1502 may be initiated while a detector is in a provisional mode. In yet another embodiment, start 1502 may invoke a provisional mode. In one implementation, a provisional mode may only be entered prior to calibrate 1060 and/or after reset 1070. While in a provisional mode, one or more circuits of the detector may be powered on.

The detector may comprise a computer-readable medium comprising computer-executable instructions, that when executed by a processor (e.g., processing circuit 112) perform at least allowing the detector to be selectively entered into a placement mode that is configured to locate an acceptable placement location for the mounting system on any of the plurality of holsters. In one implementation, the operating states or modes of a detector (e.g., detector 110 and/or 610) may include but is not limited to: sleep 1020, test 1030, field 1040, mute 1050, calibrate 1060, reset 1070, rollback 1080, a placement mode (e.g., flowchart 1500), and combinations thereof. In the illustrative example, processing circuit 112 may cooperate with or receive signals from control 118/852 to exit or enter a state of operation. Processing circuit 112 may provide information to a user via indicator 120/854 upon entering or while operating in a state. In one embodiment, control 118/852 and indicator 120/854 may comprise a single user interface (e.g., touchscreen).

In one implementation, the optimal placement of detector 110/610 and mounting system 1402 is identified at the position of maximum sensitivity to firearm 142. In another implementation, the optimal placement of detector 110/610 and mounting system 1402 is the position at which the inductance, impedance, and/or frequency exceeds a threshold.

A decision, such as for example, decision 1504, may be implemented to determine if a signal has been received to enter a placement mode. In one embodiment, a signal may be received via one or more user interfaces. In one implementation, a detector may comprise a local user interface configured to receive a user input. In yet another implementation, one or more electronic signals may be received from a remote device, such as from a user's mobile terminal or another computing device. Those skilled in the art will realize that electronic information may be received from tactile, audible, and/or other input mechanisms without departing from the scope of this disclosure. In one embodiment in which a detector comprises a local user interface, it may comprise a mechanical control, such as for example control 118 and/or 852. In one embodiment, during placement, circuit 112 may receive an electronic signal via a double press on control 118/852.

A placement mode may be initiated, such as for example, based upon receiving an electronic signal (see, e.g., block 1506). In certain embodiments, an electronic indication that the detector has entered into or is within a placement mode may be provided via one or more local or remote interfaces (see, e.g., block 1508). The indication may be via tactile, audible, visual, and/or other indicia. As merely one example in which a detector, such as detector 110 and/or 610, has a visual user interface, a processor, such as processing circuit 112, may also activate user the visual interface, in which indicator 120/854 may blink a plurality of times (e.g., three times) with a first color (e.g., a green light) indicating a placement mode has been entered or is currently invoked. While in placement mode, the detector may obtain measurements via one or more sensors located within or on the detector (see, e.g., block 1510). As one illustrative example, detector 110/610 may obtain measurements in which detector 110/610 performs multiple readings of the inductance and/or impedance while the intended weapon (e.g., firearm 142) is inserted in the holster (e.g., holster 150/650). Measurements may be transmitted to a processor, such as processing circuit 112. A processor (e.g., processing circuit 112) may execute computer-executable instructions on one or computer-readable mediums to provide an output via an output interface (e.g., see block 1512). In one embodiment, indicator 120/854 to provide a continuous visual indicium as detector 110/610 and mounting system 1402 move along an outer surface of holster 150/650.

In one embodiment of displaying a continuous indicium, such as at block 1512, indicator 120/854 may blink and/or fluctuate between a first and a second visual output (e.g., different colors, such as for example, red and green, and/or different brightness or hues), as detector 110/610 and mounting system 1402 are located along different locations of holster 150/650. As one example implementation, at optimal positions, indicator 854 may be green, while in nonoptimal positions indicator 854 may be red. Various spectrums of different colors may be utilized to provide visual cues if the instant location is detected by the detector as being more preferred or less preferred than a prior location. Those skilled in the art will appreciate that other tactile, visual, and/or audible cue s may be utilized without departing from the scope of this disclosure. In this regard, although some example embodiments are described in relation to visual indicia, those skilled in the art will appreciate that other indicia may be used to replace and/or complement such indicia.

In another embodiment of outputting continuous indicia, such as at block 1512, the frequency at which indicator 120/854 is outputting light may increase as a detector (e.g., detector 110/610) and mounting system (e.g. mounting system 1402) approach a more optimal position when compared to a prior position.

In certain embodiments, it may be determined if a signal has been received while in placement mode (e.g., see decision 1514). In one embodiment, the signal may be a control signal created in response to receiving a user input at a remote or local user input interface. In one embodiment, a control signal is received from a tactile user input interface located on the detector. As one illustrative example, it may be determined that a user input was received at one or more of control 120/854. In one embodiment, the signal is configured to represent that a user and/or a process determined that the detector is in acceptable or optimal location, yet in another embodiment, an individual process may be implemented to determine whether the detector is in an optimal or acceptable location.

Responsive to receiving a signal, the detector may exit a placement mode (see, e.g., End 1518). In one implementation, after exiting a placement mode, a detector may be configured to enter a calibrate mode (such as for example mode 1060). In one embodiment, if it is determined that a is not in an optimal or acceptable location (such as at decision 1516), the detector may be prevented from entering a calibrate mode and/or otherwise be configured to repeat one or more placement operations, including but not limited to those provided in flowchart 1500. In one embodiment, if it is determined that a detector is not in an acceptable or ideal location when receiving confirmation signal 1514, processing circuit 112 may prevent detector 110/610 from leaving the placement mode, and/or entering another mode, such as, a calibrate mode.

Aspects of this disclosure may relate to a system for positioning a weapon detector on a firearm holster comprising: a mounting system and a weapons detector. The mounting system may comprise a unitary mount having a rigid planar spine, the rigid planar spine having an upper surface separated from a lower surface by two opposing sides, and a top and a bottom, where the spine extends from the top to the bottom along a first axis; a first flexible extension extending away from the first opposing side of the spine along a second axis that is perpendicular to the first axis; and a second flexible extension extending away from the second opposing side of the spine along the second axis, the flexible extensions being configured to be flexed in a direction about the first axis; and an adhesive layer configured to adhere the lower surface of the unitary mount to a firearm holster. The system may further comprise a weapon detector configured to be mounted to the upper surface of the spine such that when the detector is mounted to the spine and the spine is mounted to an optimal location of a holster the detector is configured to detect the presence of a weapon in the holster, where the weapon detector further comprises a processor; a sensor configured to measure presence of a weapon based on at least one of inductance and impedance; a user input interface configured to receive a user input; a user output interface configured to provide an output; and a non-transitory computer readable medium comprising computer-executable instructions. The system may include where when executed by the processor, the computer executable instructions perform at least the following: responsive to receiving an electronic signal from the user input interface, initiating a detector placement mode; providing an output via the user output interface that the placement mode has been initiated; obtaining measurements from the sensor to determine a magnitude of at least one of an inductance and an impedance as the mounting system is moved about different locations on a surface of the holster; based upon the obtained measurements, determining that the detector is at the optimal location of the holster, and in response, providing an output via the user output interface; following determining the detector is at the optimal location, exiting the placement mode and entering an operating mode, wherein when the detector is mounted to the upper surface of the rigid spine and the first flexible extensions are flexed about the first axis and attached to the holster, a plurality of sensor measurements are received from the sensor; and determining from at least one sensor measurement that the firearm was removed from the holster, and in response transmitting an electronic signal configured to trigger activation of a remote device.

Implementations of the system include where the rigid planar spine comprises an inner perimeter defining an identification window, such that upon the weapon detector being mounted to the mounting system, the inner perimeter is configured to permit the visual inspection of identification information located on an outer surface of the weapon detector. In some embodiments, the user input interface and the user output interface form a single user interface. In some embodiments, the first flexible extension and the second flexible extension are located on a single homogenous structure. In some embodiments, at least one of the flexible extensions comprises a first flexible region having a first modulus of elasticity and a second flexible region having a second modulus of elasticity. In some embodiments, the adhesive layer comprises VHB tape. In some embodiments, the user output interface comprises a light source. In some embodiments, the user output interface is configured to provide an output selected from the group consisting of a tactile output, an audible output, a visual output, and combinations thereof. In some embodiments, the user input interface is located on the detector.

In various embodiments, a weapon detector configured to be utilized with a unitary mount of a firearm holster comprises: a processor; a sensor configured to measure presence of a weapon; a user input interface configured to receive a user input; a user output interface configured to provide an output; a non-transitory computer readable medium comprising computer-executable instructions, that when executed by the processor, perform at least the following; responsive to receiving an electronic signal from the user input interface, initiating a detector placement mode; providing an output via the user output interface that the placement mode has been initiated; obtaining measurements from the sensor to determine a magnitude of at least one of an inductance and an impedance as the mounting system is moved about different locations on a surface of the holster; based upon the obtained measurements, determining that the detector is at the optimal location, and in response, providing an output via the user output interface; following determining the detector is at the optimal location, exiting the placement mode and entering an operating mode; and while in the operating mode, determining from at least one sensor measurement that the firearm was removed from the holster, and in response transmitting a wireless signal to a remote device configured to trigger recording of at least one of audio information or visual information by the remote device.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing". The invention includes any practical combination of the structures and methods disclosed. While for the sake of clarity of description several specifics embodiments of the invention have been described, the scope of the invention is intended to be measured by the claims as set forth below.

The words "herein", "hereunder", "above", "below", and other word that refer to a location, whether specific or general, in the specification shall refer to any location in the specification.

What is claimed is:

1. A method performed by a detector for identifying an acceptable location of the detector with respect to a provided holster for mounting the detector on the provided holster, the detector for detecting at least one of a presence and an absence of a provided weapon in the provided holster, the method comprising:
    initiating a placement mode;
    while in the placement mode, obtaining measurements via a sensor located within the detector as the detector is moved about a surface of the provided holster;

in accordance with the measurements, determining the acceptable location of the detector with respect to the provided holster; and indicating the detector is at the acceptable location of the detector with respect to the provided holster, wherein the acceptable location allows the detector to be mounted to the provided holster in a manner that permits the detector to detect the at least one of the presence and the absence of the provided weapon in the provided holster without interfering with removal or operation of the provided weapon.

2. The method of claim 1, wherein obtaining the measurements via the sensor comprises detecting values of one of inductance, impedance, or frequency.

3. The method of claim 2, wherein determining the acceptable location of the detector with respect to the provided holster comprises determining a position at which a value of the values of one of inductance, impedance, or frequency exceeds a threshold.

4. The method of claim 1, wherein determining the acceptable location of the detector with respect to the provided holster comprises determining a position of maximum sensitivity to the provided weapon inserted in the provided holster.

5. The method of claim 1, wherein indicating the detector is at the acceptable location comprises providing indicia via an indicator.

6. The method of claim 5, wherein the indicator comprises a visual display, and wherein providing indicia via the indicator comprises displaying the indicia on the visual display.

7. The method of claim 5, wherein providing indicia via the indicator comprises providing continuous indicia as the detector is moved about the surface of the provided holster.

8. The method of claim 5, wherein providing indicia via the indicator comprises providing one of tactile, visual, and audible indicia.

9. The method of claim 1, wherein initiating the placement mode comprises:
receiving a first electronic signal from a control; and
responsive to the first electronic signal, initiating the placement mode.

10. The method of claim 1, further comprising:
responsive to receiving a second electronic signal from a control, determining whether the detector is at the acceptable location of the detector with respect to the provided holster; and
in response to determining that the detector is at the acceptable location of the detector with respect to the provided holster, exiting the placement mode.

11. The method of claim 1, further comprising:
responsive to receiving a second electronic signal from a control, determining whether the detector is at the acceptable location of the detector with respect to the provided holster; and
in response to determining that the detector is at a nonoptimal location with respect to the provided holster, remaining in the placement mode.

12. A detector comprising:
a sensor circuit;
a memory; and
a processor communicatively coupled to the sensor circuit and the memory, wherein the sensor circuit is configured to detect at least one of a presence or an absence of a provided weapon in a provided holster, and wherein the processor is configured to execute computer-executable instructions stored in the memory to perform operations comprising:
initiating a placement mode;
while in the placement mode, obtaining measurements with the sensor circuit as the detector traverses a surface of the provided holster;
in accordance with the measurements, determining an acceptable location for mounting the detector with respect to the provided holster; and
indicating the detector is at the acceptable location, wherein the acceptable location allows the detector to be mounted to the provided holster in a manner that permits the detector to detect the at least one of the presence or the absence of the provided weapon in the provided holster without interfering with removal or operation of the provided weapon.

13. The detector of claim 12, further comprising a communication circuit, wherein initiating the placement mode comprises receiving a message communicated to the detector via the communication circuit from a smart phone that includes a touch screen, and wherein the message is communicated to the communication circuit responsive to user interaction with the touch screen of the smart phone.

14. The detector of claim 12, wherein obtaining the measurements with the sensor circuit comprises detecting values of one of inductance, impedance, or frequency.

15. The detector of claim 14, wherein determining the acceptable location for mounting the detector with respect to the provided holster comprises determining a position at which a value of the values of one of inductance, impedance, or frequency exceeds a threshold.

16. The detector of claim 12, further comprising an indicator, and wherein indicating the detector is at the acceptable location comprises providing indicia via the indicator.

17. The detector of claim 16, wherein providing the indicia via the indicator comprises providing continuous indicia as the detector is moved about the surface of the provided holster, and wherein providing the continuous indicia comprises the indicator fluctuating between a first visual output and a second visual output, and wherein the first visual output and the second visual output comprise different colors, brightness, and/or hues.

18. The detector of claim 16, wherein providing indicia via the indicator comprises providing visual indicia.

19. The detector of claim 12, further comprising a communication circuit, wherein the operations further comprise:
while in the placement mode, receiving a signal via the communication circuit in response to a user input received at a remote user input interface; and
exiting the placement mode responsive to receiving the signal.

20. The detector of claim 19, wherein the operations further comprise:
after exiting the placement mode, entering a calibrate mode, and while in the calibrate mode, determining, with the sensor circuit, a magnitude of an inductance or an impedance that indicates the at least one of the presence or the absence of the provided weapon in the provided holster.

* * * * *